US010469871B2

(12) United States Patent
Su et al.

(10) Patent No.: US 10,469,871 B2
(45) Date of Patent: Nov. 5, 2019

(54) ENCODING AND DECODING OF 3D HDR IMAGES USING A TAPESTRY REPRESENTATION

(71) Applicant: Dolby Laboratories Licensing Corporation, San Francisco, CA (US)

(72) Inventors: Guan-Ming Su, Fremont, CA (US); Gregory John Ward, Berkeley, CA (US); Timo Kunkel, Oakland, CA (US); Scott Daly, Kalama, WA (US); Samir N. Hulyalkar, Los Gatos, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 353 days.

(21) Appl. No.: 14/964,862

(22) Filed: Dec. 10, 2015

(65) Prior Publication Data

US 2016/0182917 A1 Jun. 23, 2016

Related U.S. Application Data

(60) Provisional application No. 62/093,990, filed on Dec. 18, 2014.

(51) Int. Cl.
*H04N 19/597* (2014.01)
*H04N 13/161* (2018.01)
(Continued)

(52) U.S. Cl.
CPC ......... *H04N 19/597* (2014.11); *H04N 13/161* (2018.05); *H04N 19/17* (2014.11); *H04N 19/30* (2014.11); *H04N 2213/005* (2013.01)

(58) Field of Classification Search
CPC .... G06T 5/005; H04N 13/0048; H04N 7/181; H04N 13/0011; H04N 19/136;
(Continued)

(56) References Cited

U.S. PATENT DOCUMENTS

2005/0232510 A1* 10/2005 Blake ...................... G06T 5/50
382/275
2011/0254841 A1* 10/2011 Lim ...................... G06T 17/20
345/421
(Continued)

FOREIGN PATENT DOCUMENTS

WO WO 2012148883 A1 * 11/2012 ........... H04N 19/136
WO WO 2013049388 A1 * 4/2013 ......... H04N 13/0011
(Continued)

OTHER PUBLICATIONS

Pei-Kuei Tsung et al., "Single iteration view interpolation for multiview video applications," 3DTV Conference: The True Vision—Capture, Transmission, and Display of 3D Video, 2009, IEEE, May 4, 2009 (May 4, 2009), pp. 1-4 (Year: 2009).*

*Primary Examiner* — Gims S Philippe
*Assistant Examiner* — Daniel Chang

(57) ABSTRACT

Representation and coding of multi-view images using tapestry encoding are described for standard and enhanced dynamic ranges compatibility. A tapestry comprises information on a tapestry image, a left-shift displacement map and a right-shift displacement map. Perspective images of a scene can be generated from the tapestry and the displacement maps. Different methods for achieving compatibility are described.

18 Claims, 18 Drawing Sheets

(51) Int. Cl.
*H04N 19/30* (2014.01)
*H04N 19/17* (2014.01)

(58) Field of Classification Search
CPC ............. H04N 19/597; H04N 13/0022; H04N 2013/0081; H04N 13/0275; H04N 19/30; H04N 19/61; H04N 2213/005; H04N 13/0003
USPC .......... 345/419; 348/43, 409.1, 48; 382/154, 382/238, 232; 375/240.12, 240.16
See application file for complete search history.

(56) References Cited

U.S. PATENT DOCUMENTS

| | | | |
|---|---|---|---|
| 2012/0262542 A1* | 10/2012 | Veera | G06T 5/005 348/42 |
| 2012/0314027 A1* | 12/2012 | Tian | H04N 7/181 348/43 |
| 2013/0108183 A1 | 5/2013 | Bruls | |
| 2014/0015925 A1* | 1/2014 | Li | H04N 13/0048 348/43 |
| 2014/0198182 A1 | 7/2014 | Ward | |
| 2014/0348232 A1 | 11/2014 | Leontaris | |
| 2014/0376635 A1* | 12/2014 | Senoh | H04N 13/0048 375/240.16 |
| 2015/0009302 A1 | 1/2015 | Ward | |
| 2015/0341675 A1 | 11/2015 | Su | |
| 2016/0094829 A1* | 3/2016 | Georgiev | H04N 13/0048 348/43 |

FOREIGN PATENT DOCUMENTS

| | | |
|---|---|---|
| WO | 2014/107255 | 7/2014 |
| WO | 2014/2014865 | 12/2014 |

\* cited by examiner

ENCODING AND DECODING OF 3D HDR IMAGES USING A TAPESTRY REPRESENTATION

CROSS REFERENCE TO RELATED APPLICATIONS

The present application claims the benefit of priority from U.S. Provisional Patent application Ser. No. 62/093,990, filed on Dec. 18, 2014, which is incorporated herein by reference in its entirety.

TECHNICAL FIELD

The present disclosure relates to image processing, such as 3D imaging. More particularly, it relates to encoding and decoding of 3D high-dynamic range images using a tapestry representation.

BRIEF DESCRIPTION OF DRAWINGS

The accompanying drawings, which are incorporated into, and constitute a part of, this specification illustrate one or more embodiments of the present disclosure and, together with the description of example embodiments, serve to explain the principles and implementations of the disclosure.

SUMMARY

Figure 1:
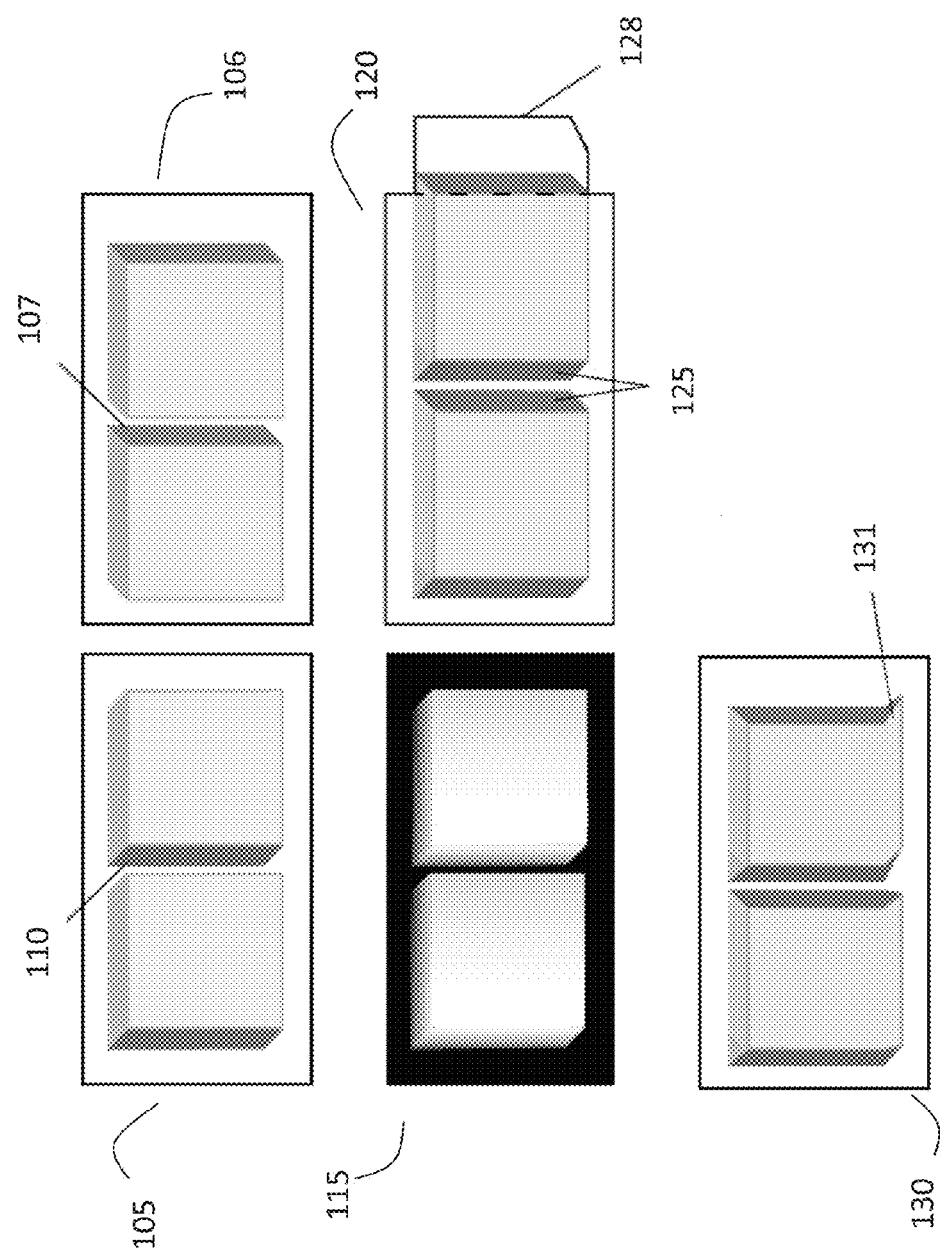
FIG. 1 depicts an exemplary embodiment of a tapestry image generation using cube images as an example.

In a first aspect of the disclosure, a computer-based method is described, the method comprising: providing an original first view image of a scene at a first dynamic range; providing an original tapestry image at the first dynamic range; generating a first view image at a second dynamic range, wherein the first dynamic range is higher than the second dynamic range; predicting, by a computer and based on the original first view image, a first view image at the first dynamic range from the first view image at the second dynamic range, thereby obtaining a predicted first view image; providing, by a computer, a first displacement map, wherein the first displacement map comprises distance information between the original first view image at the first dynamic range and the original tapestry image at the first dynamic range; applying an inverse displacement operation to the predicted first view image, thereby obtaining a predicted tapestry image, wherein the inverse displacement operation comprises shifting pixels from a position in the predicted first view image to a position in the predicted tapestry image based on the first displacement map; interpolating unfilled pixels in the predicted tapestry image; and calculating a difference between the original tapestry image and the predicted tapestry image, thereby obtaining a residual.

In a second aspect of the disclosure, a computer-based method is described, the method comprising: providing an original first view image of a scene at a first dynamic range; providing an original tapestry image at the first dynamic range; generating a first view image at a second dynamic range, wherein the first dynamic range is higher than the second dynamic range; predicting, by a computer and based on the original first view image, a first view image at the first dynamic range from the first view image at the second dynamic range, thereby obtaining a first predicted first view image; calculating a difference between the original first view image and the first predicted first view image, thereby obtaining a first residual; encoding the first residual; decoding the encoded first residual; adding the decoded first residual to the first predicted first view image, thereby obtaining a second predicted first view image; providing, by a computer, a first displacement map, wherein the first displacement map comprises distance information between the original first view image at the first dynamic range and the original tapestry image at the first dynamic range; applying an inverse displacement operation to the second predicted first view image, thereby obtaining a predicted tapestry image, wherein the inverse displacement operation comprises, based on the first displacement map, shifting pixels from a position in the second predicted first view image to a position in the predicted tapestry image; interpolating unfilled pixels in the predicted tapestry image; and calculating a difference between the original tapestry image and the predicted tapestry image, thereby obtaining a second residual.

In a third aspect of the disclosure, a computer-based method is described, the method comprising: providing an original first view image of a scene at a first dynamic range; providing an original tapestry image at the first dynamic range; generating a first view image at a second dynamic range, wherein the first dynamic range is higher than the second dynamic range; providing, by a computer, a first displacement map, wherein the first displacement map comprises distance information between the original first view image at the first dynamic range and the original tapestry image at the first dynamic range; applying an inverse displacement operation to the first view image at the second dynamic range, thereby obtaining a first tapestry image at the second dynamic range, wherein the inverse displacement operation comprises, based on the first displacement map, shifting pixels from a position in the first view image at the second dynamic range to a position in the first tapestry image at the second dynamic range; interpolating unfilled pixels in the first tapestry image at the second dynamic range; content mapping the original tapestry image, thereby obtaining a second tapestry image at the second dynamic range; calculating a difference between the first tapestry image at the second dynamic range and the second tapestry image at the second dynamic range, thereby obtaining a first residual; encoding the first residual; decoding the encoded first residual; adding the decoded first residual to the first tapestry image at the second dynamic range, thereby obtaining a third tapestry image at the second dynamic range; predicting, by a computer, a tapestry image at the first dynamic range from the third tapestry image at the second dynamic range, thereby obtaining a predicted tapestry image at the first dynamic range; and calculating a difference between the original tapestry image at the first dynamic range and the predicted tapestry image at the first dynamic range, thereby obtaining a second residual.

In a fourth aspect of the disclosure, a computer-based method is described, the method comprising: providing an original desired view image of a scene at a first dynamic range, the desired view being a view between a first view and a second view; providing an original tapestry image at the first dynamic range; generating a desired view image at a second dynamic range, wherein the first dynamic range is higher than the second dynamic range; predicting, by a computer and based on the original desired view image, a desired view image at the first dynamic range from the desired view image at the second dynamic range, thereby obtaining a predicted desired view image; providing, by a computer, a first displacement map, wherein the first displacement map comprises distance information between an original first view image at the first dynamic range and the original tapestry image at the first dynamic range; providing, by a computer, a second displacement map, wherein the second displacement map comprises distance information between the original second view image at the first dynamic range and the original tapestry image at the first dynamic range; applying an inverse displacement operation to the predicted desired view image, thereby obtaining a predicted tapestry image, wherein the inverse displacement operation comprises shifting pixels from a position in the predicted desired view image to a position in the predicted tapestry image based on the first and second displacement maps; interpolating unfilled pixels in the predicted tapestry image; and calculating a difference between the original tapestry image and the predicted tapestry image, thereby obtaining a residual.

In a fifth aspect of the disclosure, a computer-based method is described, the method comprising: providing a first tapestry image; decomposing the first tapestry image into at least a first layer and a second layer; generating, based on the second layer, a second tapestry image; applying an inverse decomposition operation to the second tapestry image; predicting, by a computer, a third tapestry image from the second tapestry image, thereby obtaining a predicted tapestry image; and calculating a difference between the first tapestry image and the predicted tapestry image, thereby obtaining a residual.

In a sixth aspect of the disclosure, a computer-based method is described, the method comprising: receiving a first view image at a first dynamic range; predicting, by a computer, a first view image at a second dynamic range from the first view image at the first dynamic range, thereby obtaining a predicted first view image, wherein the first dynamic range is lower than the second dynamic range; receiving a first displacement map, wherein the first displacement map comprises distance information between an original first view image at the second dynamic range and an original tapestry image at the second dynamic range; applying an inverse displacement operation to the predicted first view image, thereby obtaining a predicted tapestry image, wherein the inverse displacement operation comprises shifting pixels from a position in the predicted first view image to a position in the predicted tapestry image based on the first displacement map; interpolating unfilled pixels in the predicted tapestry image; receiving an enhancement layer; and adding the enhancement layer to the predicted tapestry image, thereby obtaining a reconstructed tapestry image.

In a seventh aspect of the disclosure, a computer-based method is described, the method comprising: receiving a first view image at a first dynamic range; predicting, by a computer, a first view image at a second dynamic range from the first view image at the first dynamic range, thereby obtaining a predicted first view image, wherein the first dynamic range is lower than the second dynamic range; receiving a first enhancement layer; adding the first enhancement layer to the predicted first view image, thereby obtaining a reconstructed first view image; receiving a first displacement map, wherein the first displacement map comprises distance information between an original first view image at the second dynamic range and an original tapestry image at the second dynamic range; applying an inverse displacement operation to the reconstructed first view image, thereby obtaining a predicted tapestry image, wherein the inverse displacement operation comprises shifting pixels from a position in the reconstructed first view image to a position in the predicted tapestry image based on the first displacement map; interpolating unfilled pixels in the predicted tapestry image; receiving a second enhancement layer; and adding the second enhancement layer to the predicted tapestry image, thereby obtaining a reconstructed tapestry image.

In an eighth aspect of the disclosure, a computer-based method is described, the method comprising: receiving a first view image; receiving a first displacement map, wherein the first displacement map comprises distance information between an original first view image at a second dynamic range and an original tapestry image at the second dynamic range, and wherein the first dynamic range is lower than the second dynamic range; applying an inverse displacement operation to the first view image, thereby obtaining a first tapestry image, wherein the inverse displacement operation comprises shifting pixels from a position in the first view image to a position in the first tapestry image based on the first displacement map; interpolating unfilled pixels in the first tapestry image, thereby obtaining an interpolated tapestry image; receiving a first enhancement layer; adding the first enhancement layer to the interpolated tapestry image, thereby obtaining a first reconstructed tapestry image at the first dynamic range; predicting, by a computer, a second reconstructed tapestry image at the second dynamic range from the first reconstructed tapestry image at the first dynamic range; receiving a second enhancement layer; and adding the second enhancement layer to the second reconstructed tapestry image at the second dynamic range, thereby obtaining a third reconstructed tapestry image at the second dynamic range.

In a ninth aspect of the disclosure, a computer-based method is described, the method comprising: receiving a first tapestry image; applying an inverse layer decomposition operation to the first tapestry image, thereby obtaining a predicted tapestry image; receiving an enhancement layer; and adding the enhancement layer to the predicted tapestry image, thereby obtaining a reconstructed tapestry image.

In a tenth aspect of the disclosure, a computer-based method is described, the method comprising: providing an original first view image of a scene at a first dynamic range; providing an original tapestry image at the first dynamic range; providing, by a computer, a displacement map, wherein the displacement map comprises distance information between the original first view image at the first dynamic range and the original tapestry image at the first dynamic range; and generating, by a computer, the inverse displacement map, based on the displacement map, wherein the generating comprises comparing a displacement for at least two pixels, thereby determining a pixel of the at least two pixels having a greater displacement than remaining pixels of the at least two pixels; and selecting the pixel having the greater displacement.

DESCRIPTION OF EXAMPLE EMBODIMENTS

Image processing for images and displays in higher than two dimensions, e.g. 3D, involves processing and transmitting of information related to a scene as viewed from multiple viewpoints. An image captured by viewing a scene from a viewpoint can be referred to as a view. Such images, can, for example, be displayed in stereoscopic and autostereoscopic displays. In particular, autostereoscopic devices are able to provide stereoscopic vision without the use of 3D glasses.

As described herein, an 'autostereo image' is an image which is able to provide stereoscopic vision without the use of 3D glasses. As described herein, a 'scene' is the content of an image or picture, for example, a scene might be a wide-shot of downtown Los Angeles, or a close-up view of multiple objects on a table. As described herein, a 'leftmost view' is an image, for example captured by a camera, taken from the leftmost point of view, looking at a scene. As described herein, a 'rightmost' view is an image, for example captured by a camera, taken from the rightmost point of view, looking at a scene. As described herein, a 'disparity map' is a group of values associated with an image, which describes a difference between values of two maps or images. For example a disparity map might describe the difference in position between a left view and a right view, the two views constituting a stereo image. The disparity map might have a value for each pixel, describing the apparent motion for that pixel, between the left view image and the right view image. The apparent motion may be described as pixel intensity in the disparity map.

An autostereo display provides multiple views, from a few to 60 or more. The purpose of providing such a high number of views is for multiple audience members to be able to view a scene from different locations while receiving, at each location, a left and right eye view, both of which are needed for stereo perception. Only two views (a left eye and a right eye view) are needed at a specific location, but a viewer (or a group of viewers) might be positioned at different locations which are not necessarily known in advance.

Additionally, providing multiple views enables a single viewer to see incrementally new views of a scene with even slight head movements. In such cases, a certain degree of parallax is provided as well, giving the audience a "peer-around" effect as they shift their heads horizontally.

When processing and transmitting multiple views, some information of a scene may be occluded in one view, but may be visible in one or more other views. As a trivial example, by closing alternatively the right eye and the left eye, a person will see some things in the field of view of the left eye, which are not visible to the right eye (assuming the person does not move). It is possible to reduce the bandwidth requirements when transmitting multiple views by sending a single view, with additional metadata that allows the reconstruction of an additional view by taking into account the occluded areas. For example, a single perspective (e.g., a single view image, or reference image) can be recorded along with a distance value for each pixel (e.g., a depth map, or how far from the viewer each pixel is). Subsequently, view-synthesis techniques can be used to generate the needed image for each specific, different view, based on the reference image and the depth map. For example, left eye and right eye images may be derived, thereby enabling stereoscopic vision.

Using the per-pixel depth (the depth map), it is possible to predict the position of a pixel in closely related views (e.g., mid right, and extreme right). The caveat to this approach is that disoccluded regions in the image (regions that were occluded in the reference view that are revealed in the needed view) may occur in certain viewpoints but may have no corresponding image data. In this case such pixels would need to be filled. While there are techniques for "filling-in" these regions, they are generally most successful for disoccluded regions that are of uniform color. Such techniques often do less well for regions with gradient colors and texture. The most difficult region to fill is that containing SKE (signal-known-exactly) content, such as alphanumeric and other graphical imagery, faces, and small known objects which may be easily recognizable by a human viewer, but not by a computerized filling method.

An alternative image processing method enables a more comprehensive inclusion of data in the image which is used to predict multiple views, thereby improving image quality, and limiting artifacts in the final image. Such autostereoscopic representation is referred to as autostereoscopic tapestry representation (or, in short, tapestry or tapestry representation), because it covers most of the points of interest in a scene, similarly to laying a thin cloth over objects and recording their colors. Other representations may be stereoscopic, or 3D. In some embodiments the tapestry images of the present disclosure may be autostereoscopic or stereoscopic (3D). In the following, tapestry images may be termed as autostereoscopic tapestry images (AST), however the person skilled in the art will understand that the same methods may be used for non-autostereoscopic tapestry images, such as, for example, stereoscopic tapestry images.

In several embodiments of tapestry representation, two extreme views (e.g. far left and far right) are provided as a bounding input, corresponding to the leftmost and rightmost eye position in the target device class. They are bounding in the sense that all possible views which can be derived will be contained within these far left and far right. In other embodiments, a different choice of the 'extreme' views might be taken, which is substantially close to the far left and far right.

In other embodiments of tapestry representation, a tapestry representation is derived that contains foreground and background pixels from both leftmost and rightmost views and a pair of displacement maps that indicate how these pixels were shifted relative to each of the two original leftmost and rightmost views. This representation has similar advantages to the representation, described above, using a single image plus depth map, but in addition it often does not have a need to fill disoccluded regions, as everything that was seen from the two input views (leftmost and rightmost) can be present in the combined tapestry output. In some embodiments of the disclosure, the conveyance of the disoccluded regions is not perfect, and consequently some disoccluded regions will not have associated image information. However, even in such cases, the amount of artifacts potentially present in the final image is reduced.

Referring to FIG. 1, a left eye view (105) and a right eye view (106) are provided. Two exemplary areas are shown of occluded regions: area (110) is occluded to the right eye, while area (107) is occluded to the left eye. In several embodiments, the left eye view (105) and right eye view (106) comprise the leftmost eye view and rightmost eye view. The left eye view (105) and right eye view (106) are the input images for the subsequent processing. For example, with no loss of generality, the two views may be acquired by two identical cameras having only a horizontal offset between them. Different cameras may be used, for example the cameras may have either parallel optical axis, or convergent axis.

Depth information for the image pixels of one of the two input images, (105) or (106) is acquired, for example for the left eye view (105) in FIG. 1, thus obtaining a depth map (115). Alternatively, a stereo correspondence technique could be used to determine the differences between the left eye view (105) and the right eye view (106). The purpose of this step is to determine which pixels from the left eye view (105) and the right eye view (106) are common to the two input images (105) and (106), as well as which pixels are present in the right eye view image (106) but not in the left eye view image (105). An image can then be created (120) which includes both the pixels common to the views (105) and (106), as well as the pixels from the right eye view (106) that are not found in the left eye view image (105). Alternatively, a different choice might be made, to use the right eye view (106) as a basis, in which case pixels present in the left eye view (105) but not in the right eye view (106) would be inserted in the expanded image (120). Such alternative approach could be used for any embodiment of the disclosure.

Continuing with the example of FIG. 1, using the left eye view (105) as a basis, the image (120) is obtained, which includes information from both images (105) and (106), and is therefore termed an expanded image. This expanded tapestry image (120) contains the occluded regions (125) of both views (105) and (106), and may also contain an expanded area outline (128) with occluded regions which extends beyond the standard image dimension of the input views (105) and (106). The expanded image (120) may be optionally squeezed horizontally to fit within the original image size of the input views (105) and (106). This optional compression is shown in the image (130). In the image (130) a more heavily compressed region (131) is visible, corresponding to the scanlines which contain a greater part of occluded regions. As known by those skilled in the art, a scanline corresponds to a horizontal row in the image.

In some embodiments, a disparity map may need to be calculated, such as with optically captured scenes or other un-informed image input. In other implementations, a disparity map may be derived from available depth maps, such as from a computer rendering, or from post-production algorithms, perhaps including human modifications.

Figure 2:
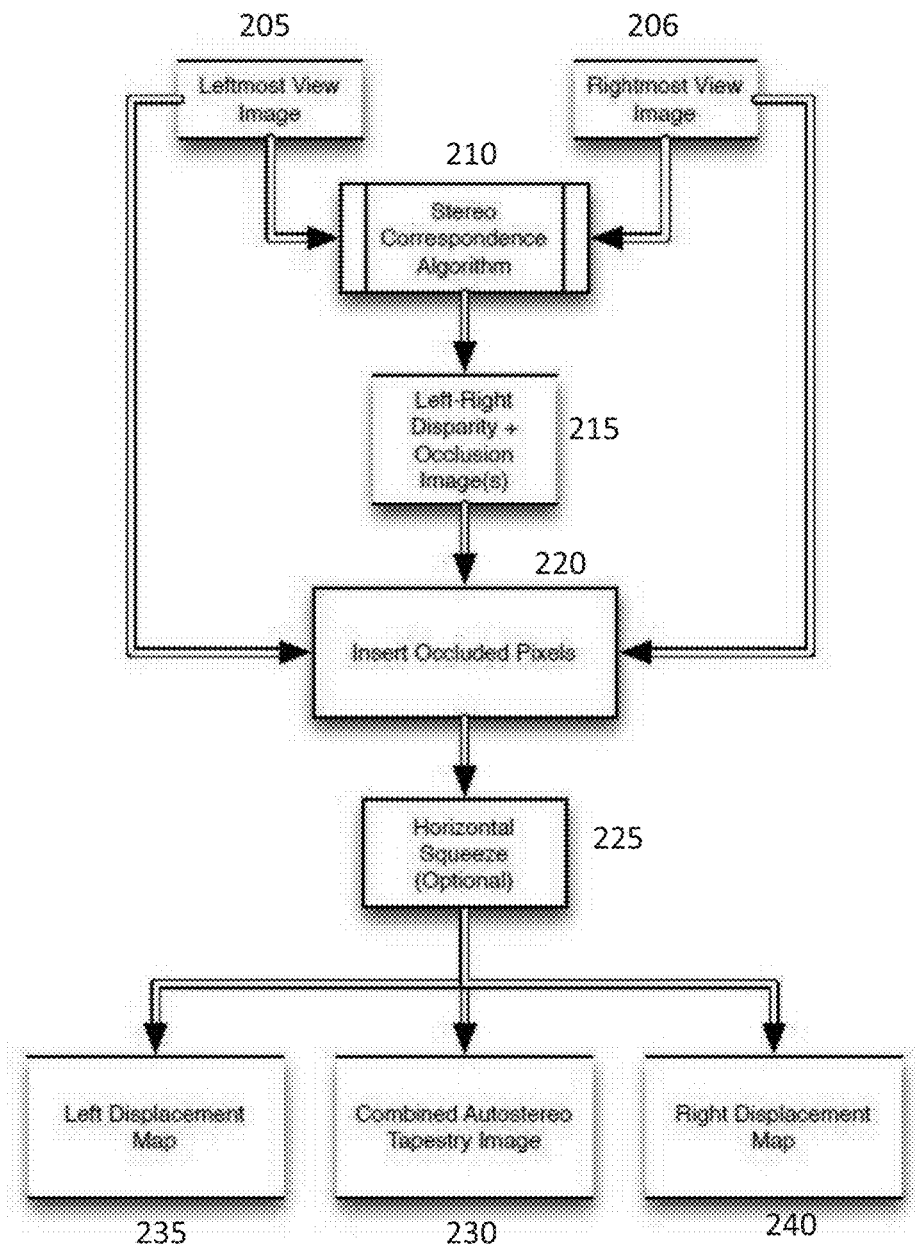
FIG. 2 depicts an exemplary embodiment of a method for tapestry image generation.

FIG. 2 illustrates an embodiment of tapestry construction with a block diagram. A left (205) and right (206) image input is provided. These two images (205, 206) are analyzed through a stereo correspondence algorithm (210). Several correspondence algorithms known to the person skilled in the art could be used. As mentioned above, an alternate embodiment is to use an input depth map generated by other means, instead of the correspondence algorithm (210). Therefore, step (210) may comprise a correspondence algorithm (210) or an alternative method based on a depth map. After step (210), at least one image comprising a disparity map and an occlusion map are obtained (215).

In the next step, the left (205) and right (206) images, together with the disparity and occlusion maps (215), are input a module which inserts occluded pixels (220). In step (220), the occlusion map (215) is used to guide the insertion of pixels from the right image (206) into the left image (205). Alternatively, the occlusion map (215) could be used to guide the insertion of pixels from the left image (205) into the right image (206).

It may be advantageous to produce a consistent scanline that minimizes depth discontinuities thus ensuring efficient encoding of the final result. An optional "Horizontal Squeeze" (225) stage reduces each scanline to the original length of the input images (205,206) by any number of resampling techniques such as nearest neighbor or cubic spline. In this embodiment, the final outputs are: the (optionally squeezed) tapestry image (230) and two displacement maps (235,240), one for the left extreme image (235) and one for the right (240).

Figure 3:
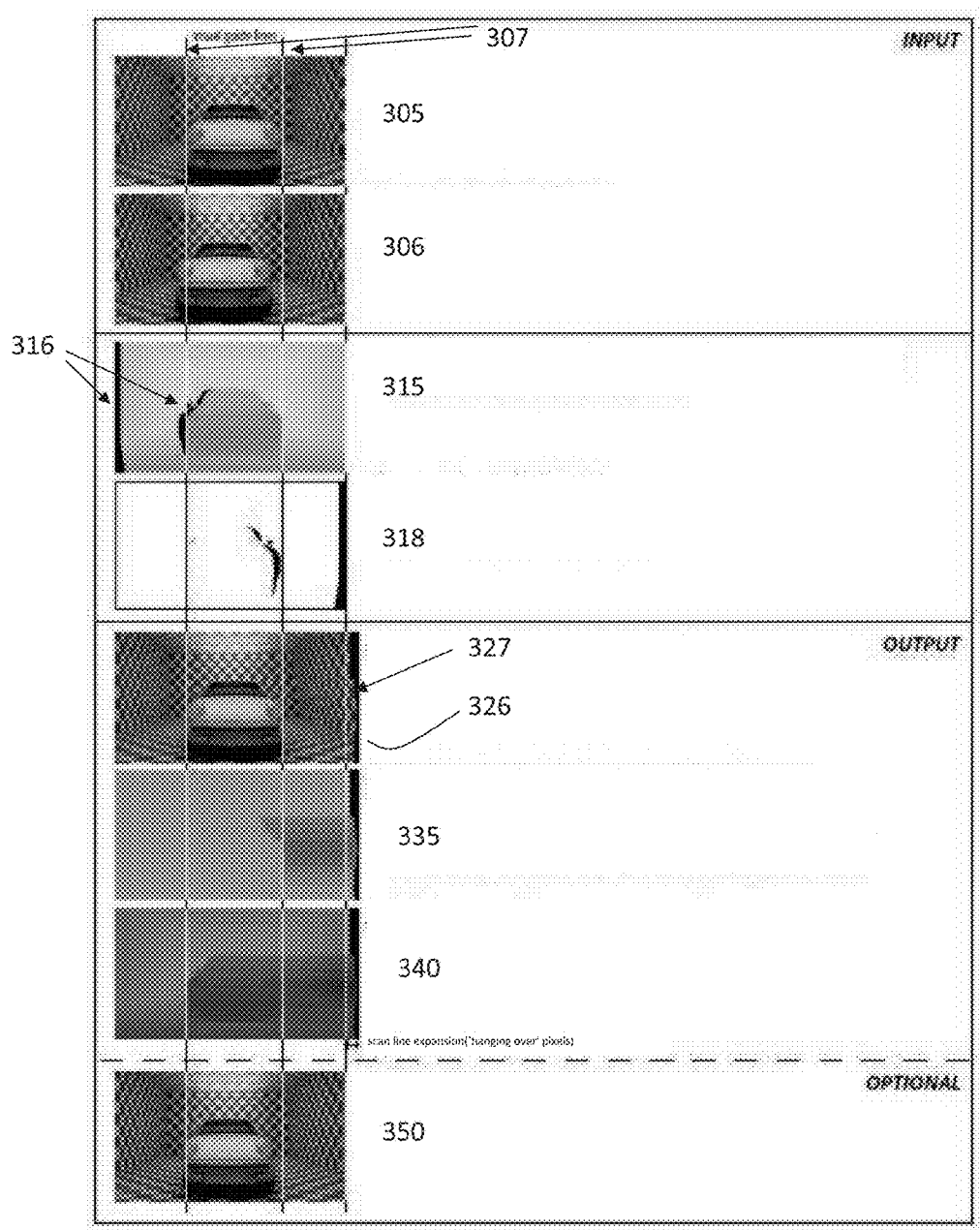
FIG. 3 depicts an exemplary embodiment of the method of FIG. 2 with a car image.

FIG. 3 illustrates an embodiment of a tapestry generation process with an example scene. A tapestry may be computed either in parallel or sequentially, as the algorithm used is mostly scanline-independent, therefore it can be executed in parallel. A left (305) and right (306) extreme image is shown at the top of FIG. 3. The visual guidelines (307) make apparent the different perspective of the leftmost (305) and rightmost (306) images. A displacement (disparity) map (315) gives the horizontal offsets needed in the pixels of the right image (306) to get to their corresponding position in the left view (305). The displacement map (315) may be computed using a stereo matching algorithm or derived from a depth map. Occluded regions (316) are shown in the map (315).

A map (318) of occluded pixels in the right view (306) as seen from the left (305) may also be computed. The occluded pixels are pixels of the rightmost view (306) which cannot be seen (are occluded) from the leftmost view (305) point of view. Alternatively, a similar process would occur in reverse for the left view (305) as seen from the right (306), but only one approach is needed for a given implementation. In this example, pixels from the rightmost view (306) are inserted into the leftmost (305) to form a tapestry, so the occlusion map (318) is used to indicate which pixels to insert.

The completed tapestry image (326) is shown in FIG. 3 with the pixel insertions determined in the previous steps (315, 318). Such pixel insertions can cause data to overflow the right-hand margin (327). The more occluded areas there are, the further the scanline will expand to the side (327). The expanded tapestry image (326), containing the disoccluded views can then be stored or transmitted. The disoccluded views comprise information that is absent in either the leftmost (305) or rightmost (306) views, but is included in the tapestry image (326). In some applications, it may be desired to keep the image format dimensions of image (326) the same as the input dimensions of views (305) and (306) (e.g., 1920×1080 for an HD image format).

The left-shift displacement map (335) records the pixel offsets needed in the transformation from the tapestry image (326) to the leftmost view image (305). In one embodiment, the offsets may be encoded as intensity in image (335). It can be noted that each scanline expands independently of the other scanlines. Image (340) records the offsets needed in the transformation from the tapestry image (326) to the rightmost view image (306). Image (340) may be obtained from the disparity map (315) plus information on the pixel shifts inserted in the tapestry image (326).

In a last step, all three maps (326, 335, 340) may be compressed back to the original image size of images (305, 306), as shown in image (350). Compression will also modify the displacement values as compressed pixels are also displaced. Alternatively, the pixels overflowing the original image size, such as the pixels in (327), may be encoded as a sidechannel.

The embodiment of FIG. 3 describes how to encode a tapestry image, with metadata which permits reconstructing the original views (305, 306). The images (326, 335, 340), or alternatively, image (350) plus a sidechannel describing the overflowing pixels, may be transmitted to a desired hardware. The hardware then decodes the received information and reconstructs views (305, 306) from (for example) images (326, 335, 340).

Figure 4:
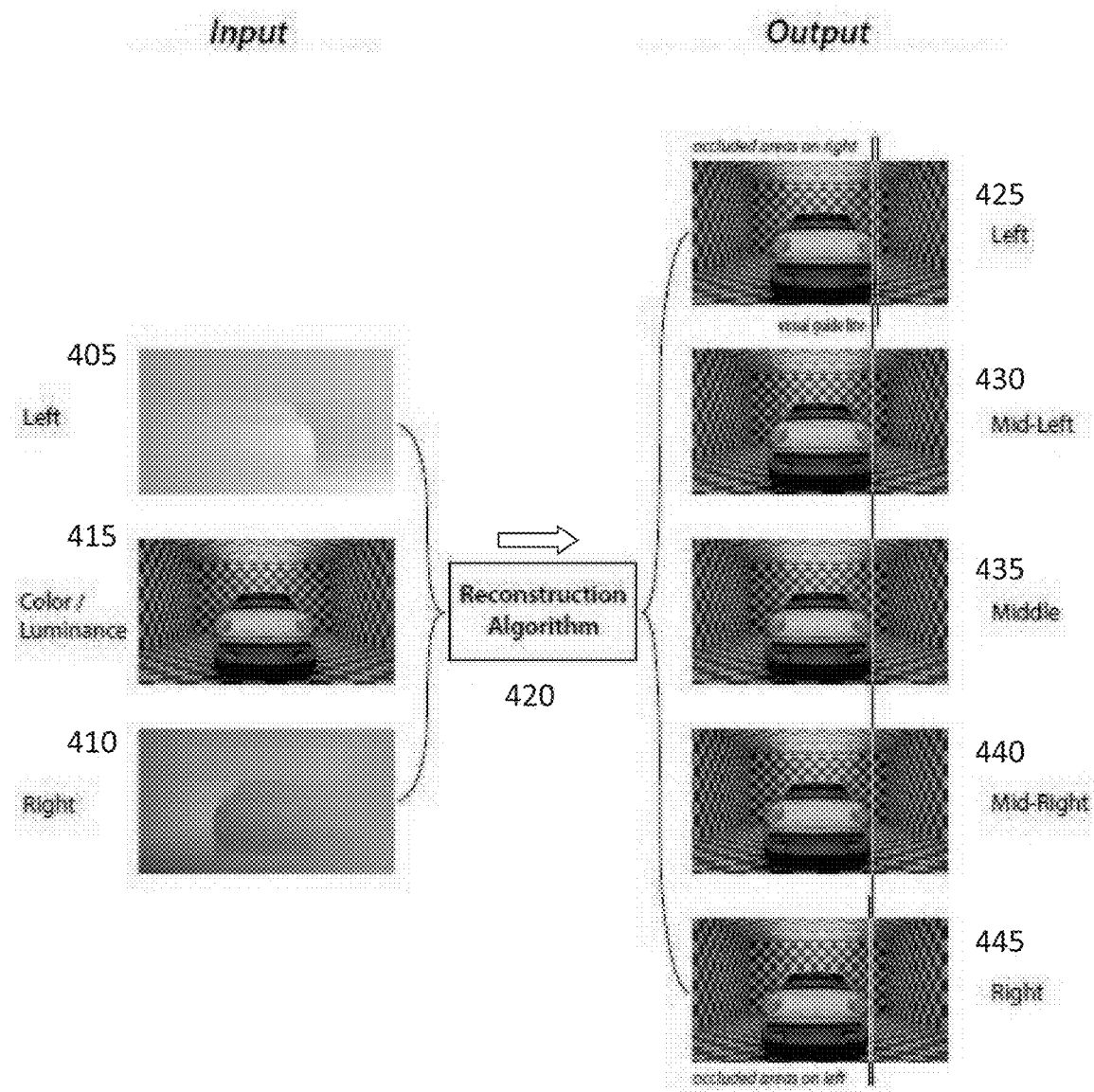
FIG. 4 depicts an exemplary embodiment of a reconstruction algorithm.

FIG. 4 illustrates an example embodiment of a reconstruction algorithm, using the left (335) and right (340) displacement maps of FIG. 3. Referring to FIG. 3, thanks to the additional information about occluded regions included in a tapestry image, such as image (327) or (350), it may be possible to render any desired view between the left (305) and right (306) extreme input views (305, 306) with a minimum of pixel infilling required. Since pixel infilling may introduce artifacts, this is a desirable outcome. The cases that require filling in occur when an occluded region is occluded to both the left (305) and right (306) bounding viewpoints (305,306). These types of occlusions may often be caused by cavity structures, and the narrower cavities have more mutual occlusions, common to both left (305) and right (306) viewpoints. An example would be looking into the barrel of a gun. However, the narrower cavities often have a relatively low amount of pixels in their regions. Also, cavities tend to be shadowed regions, so the problems due to needed infilling are vastly reduced as compared to the disoccluded regions corresponding to the open sides of objects, which normally will have more details and structure.

In FIG. 4, the left-shift displacement map (405) and the right-shift displacement map (410) are used with the tapestry image (415) by the reconstruction algorithm (420). Any intermediate horizontal viewpoint between the leftmost (425) and rightmost (445) viewpoints can be calculated. In FIG. 4, some examples are shown, such as mid left (430), middle (435), and mid right (440).

From the description above, it can be understood that a tapestry generator encoder can use the left- and right-most view images as well as a disparity map and an occlusion map, to generate a tapestry image, left- and right-displacement maps. Optionally, the encoded images can be compressed. A tapestry generator decoder can decompress a compressed source to a tapestry image, a left-displacement map and a right-displacement map. Using the tapestry image, the left-displacement map and the right-displacement map, the required views are then reconstructed by a decoder and view generator unit. Images and metadata, or signals, may be compressed during transmission from the encoder to the decoder, therefore a compression operation may be applied at the encoder prior to transmission, and a corresponding decompression operation may be applied at the decoder upon reception of the encoded signal.

As described herein, an enhanced dynamic range (EDR) is a range that is expanded relative to a standard dynamic range (SDR) in order to provide better quality images to the human eye, which is capable of perceiving great variations of brightness in images. In some embodiments, the EDR image can be obtained from a SDR image in addition to an enhancement layer (EL) which conveys information additional to the SDR image. The additional information allows the reconstruction of the EDR image based on the SDR image and the enhancement layer. The SDR image may also be referred to as base layer (BL). The term 'backward compatible' (BC) refers to the fact that the algorithm applies new methods, however remains compatible with older devices. For example, the method may produce both a SDR image compatible with older devices, and an EDR image which can be displayed on devices with a higher dynamic range. In some embodiments, the term 'residual' refers to the difference between an image and a predicted image. This difference may be used to enhance the predicted image. For example, at the encoder side, taking a difference between the predicted EDR image and the actual EDR image gives the residual. At the decoder side, the predicted EDR image can be added to the residual to obtain an improved predicted EDR image. The residual may be part of the information used to generate an enhancement layer.

In the present disclosure, different systems and methods are described to encode the EDR content through an autostereo tapestry (AST) format, either with or without backward-compatibility. As explained in the present disclosure, above, AST can be an effective way to provide free-view and multiple-view images, such as, for example, a 3D movie, while significantly reducing artifacts due to occlusion. Autostereo tapestry methods to fill-in occluded area are described, for example, in reference [1]. In some embodiments, AST methods are aimed at the SDR content. In the present disclosure, several embodiments are described to provide AST for EDR content. Therefore, the present disclosure describes methods and systems on encoding EDR content using AST technology.

In the following, different applications are considered. Some of these applications require backward-compatibility while others do not. As used herein, backward-compatibility of autostereo tapestry for EDR content may comprise: (1) backward compatibility from autostereo tapestry images (which can involve multiple views) to 2D images (which are single view), and (2) backward compatibility from EDR images to SDR images. Some of these backward-compatibility concepts are described in reference [2]. In some embodiments, for complete backward compatibility, both concepts mentioned above, multiple views (AST) to 2D and EDR to SDR, may be desired. In addition, depending on the granularity of backward compatibility, a multiple layer codec can be used to provide separate scalability for backward compatibility. For non-backward compatibility, the above requirements for compatibility with 2D and SDR are not needed. However, if the codec used is an 8-bit codec, there may be a need to use reshaping and layer decomposition to encode the autostereo tapestry EDR video to avoid banding and blocky artifacts, as described, for example, in reference [3].

In some embodiments, to provide autostereo to 2D image scalability, an inverse displacement and interpolation method is described in the present disclosure. This method shifts the pixels and interpolates to the occluded areas to generate a predicted tapestry image. By doing so, the predicted tapestry image can be aligned with the original tapestry image, including the non-occluded areas. Thus, the residual can be minimized to achieve a lower bit rate. Requirements for the metadata to assist the shifting and interpolation are also addressed in the present disclosure. Several efficient methods to encode the displacement map are also described herein.

Depending on the targeted application, the methods herein described address first whether backward-compatibility is required or not. If backward-compatibility is required, the methods described herein also consider the level of granularity required in backward-compatibility. For example, the following embodiments may be employed.

Backward compatibility to left/right view: one step.
a. provide SDR and 2D compatibility at the same time.
Backward compatibility to left/right view: two step.
a. provide SDR compatibility first, 2D compatibility later.
b. provide 2D compatibility first, SDR compatibility later.
Backward compatibility to central view (preferred view): one step.
a. provide SDR and 2D compatibility at the same time. This is a generic method which covers also the case of backward-compatibility to left/right view in one step.
Backward compatibility to central view (preferred view): two-step.
a. This is a generic method which covers also the case of backward-compatibility to left/right view in two steps.
Non-backward compatibility.

I. Backward-Compatible Architecture to Left/Right View

In this section, the backward-compatible architecture and method to left/right view is described with the corresponding algorithms and metadata. Depending on how many codec layers can be supported to achieve different scalability, a one-step solution or a two-step solution can be applied.

I.1 2D and SDR Backward-Compatibility to Left/Right view: One Step

Figure 5:
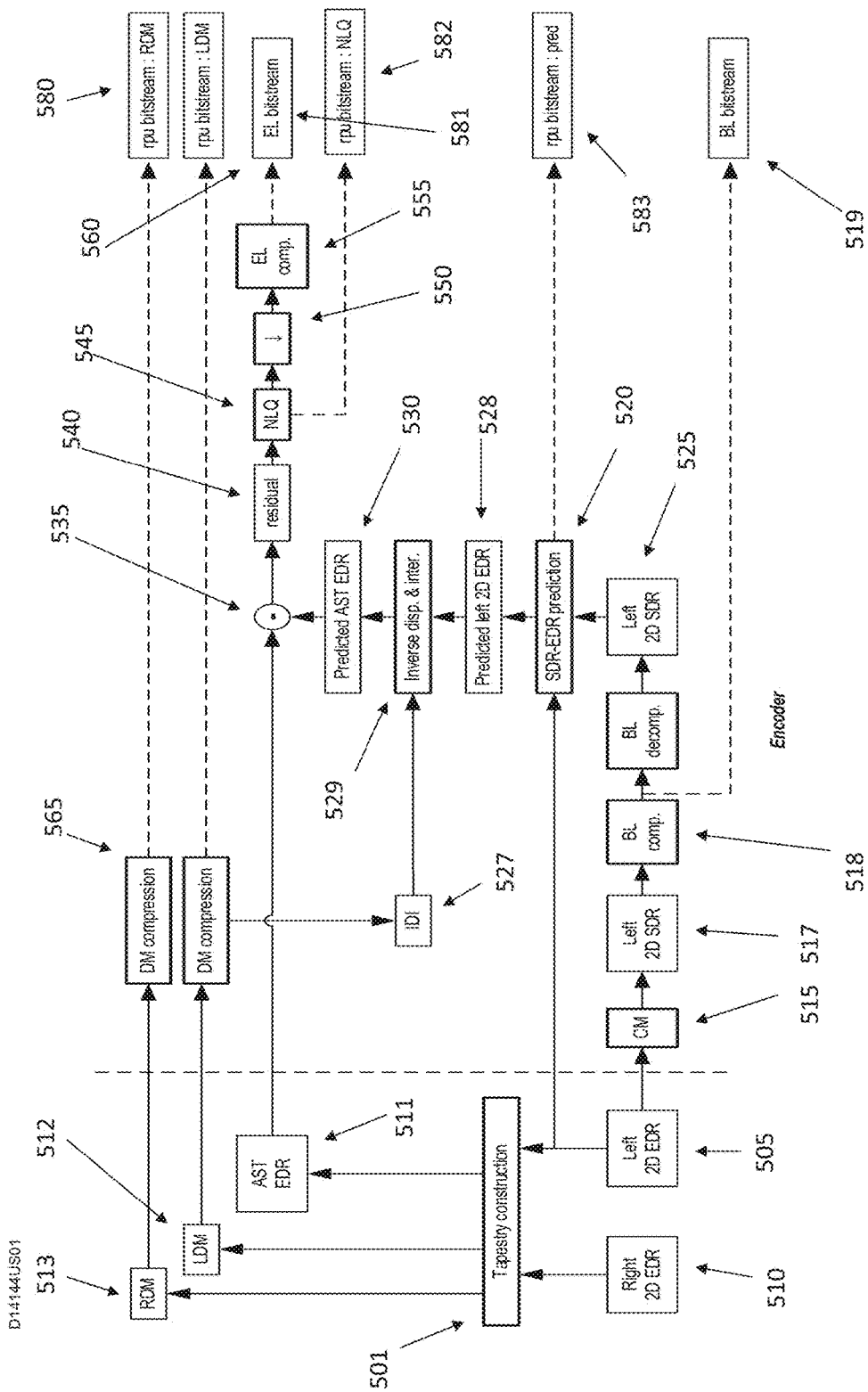
FIG. 5 illustrates an exemplary algorithm for tapestry image construction with 2D and SDR backward-compatible architecture at the encoder side.

In this architecture, the output from the base layer is the 2D SDR image, either left view or right view. After adding the enhancement layer image, the output is the autostereo tapestry EDR image. FIG. 5 illustrates an exemplary algorithm for tapestry image construction with 2D and SDR backward compatibility at the encoder side, as described in the following steps.

STEP A: Tapestry Image Construction. At the encoder side, there are two inputs to the tapestry image construction module (501): the left (or leftmost, or most representative view in left side) view 2D EDR image sequence (505) and right view (or rightmost, or most representative view in right side) 2D EDR image sequence (510). As described in the present disclosure as well as in reference [1], there are 3 outputs from the tapestry construction module (501): 1) the autostereo tapestry (AST) EDR image (511); 2) the left displacement map (LDM, 512); 3) the right displacement map (RDM, 513).

The left displacement map (512) records the pixel offsets needed in the transformation from the tapestry image to the left image. The dimensions of the LDM (512) are identical to the dimensions of the AST EDR image (511), as the LDM (512) describes the movement for each pixel in the AST EDR image (511).

The right displacement map (513) records the offsets needed in the transformation from the tapestry image to the right image. The dimensions of the RDM are identical to the dimensions of the AST EDR image (511), as the RDM (513) describes the movement for each pixel in the AST EDR image (511).

STEP B: Base Layer Encoding. To meet the requirement of backward compatibility to 2D and SDR images, one view (e.g. left view) EDR image (505) can be chosen. Alternatively, a different view may be chosen, for example the right view. After choosing, for example, the left view (505), content mapping (CM, 515) can be performed to generate a targeted 2D SDR image (517), for example in either 8-bit or 10-bit. In some embodiments, this 2D SDR video sequence can be encoded using a legacy codec as the base layer (BL, 518), and the compressed BL bitstream (519) can be played back at any legacy device. In this way, backward compatibility is obtained by using legacy codecs. For the compression of the BL (518), standard or proprietary encoders can be used, such as for example H.264, H.265 or other encoders known to the person skilled in the art.

STEP C: 2D SDR to 2D EDR prediction. In this step, the prediction coefficients are found, for an inverse mapping operation from the 2D SDR (for example, a 100 nits Rec.709 8/10 bit image) back to the 2D EDR domain (for example, 4000 nits P3/Rec.2020 image in 12 bits or more). To find the prediction coefficients, the original 2D EDR video (505) and the decompressed base layer data (525) are taken as the input to the prediction module (520). One embodiment of the detailed prediction procedure is described, for example, in reference [2]. Summarizing the description of reference [2], the luma is predicted via 8-piece second order polynomial and the chroma is predicted by the cross color channel predictor multi-channel multiple regression. The prediction procedure of reference [2] is one example, but in other embodiments alternative predictors known in the art may be applied instead.

STEP D: 2D EDR to AST EDR inverse displacement and interpolation (IDI). In this step, the inverse displacement operation (527) needs to be performed, to move pixels from the left view (528) to the corresponding locations in the tapestry image. After the inverse displacement (529), the left view is smaller than the tapestry image; therefore, there will be some unfilled areas in the predicted tapestry image. A round of interpolation (529) to generate values for those missing pixels is needed. After the displacement and interpolation operations (529), the predicted tapestry image (530) is obtained. In other words, the predicted tapestry image (530) is obtained from the left view 2D EDR image (505) and the left displacement map (512).

In the present disclosure, several methods comprise the prediction of an image. For example, in FIG. 5 the EDR image is predicted (520) from the SDR image (525) based on the original EDR image (505). Similarly, the tapestry image may be predicted (530), and then a subtraction operation (535) applied to the original tapestry image (511). Therefore, in the present disclosure it is intended that a distinction may be made between the original images, such as the examples above, and the predicted images.

Figure 6:
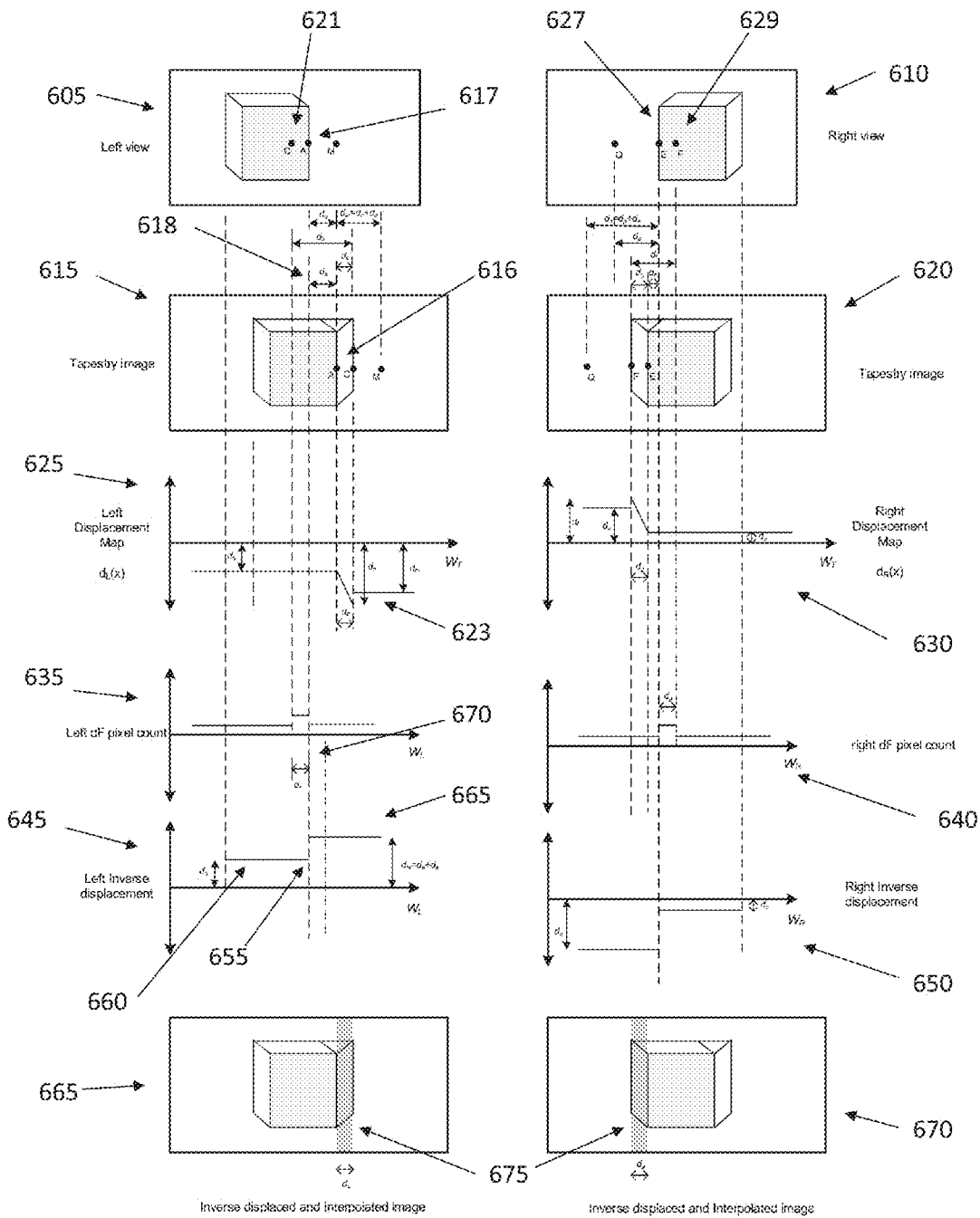
FIG. 6 depicts an exemplary embodiment of an inverse displacement and interpolation algorithm.

STEP D.1: Inverse Displacement. In the tapestry image construction process (501), there are two input images, left view (505) and right view (510), and three outputs: the tapestry image (AST, 511), the left displacement map (LDM, 512) and the right displacement map (RDM, 513). As shown in FIG. 6, in some embodiments the two input images are the left view (605) and the right view (610). The tapestry images (615, 620) are then obtained for the left and right views. Subsequently, the left (625) and right (630) displacement maps are obtained.

The left displacement map (625) records the pixel offsets needed in the transformation from the tapestry image (615) to the left image. As seen in FIG. 6, there are negative offsets in this case (below the Cartesian axis). For the non-occluded areas, such as point A (617) in the left view (605) and the corresponding point A (616) in the tapestry image (615), there is a displacement value $d_a$ (618). For the occluded areas, such as point C (621), the corresponding areas are known. Point C (621) is occluded by the front surface. The displacement value for point C is $d_b$ (623). Similarly, the right displacement map (630) records the offset needed in the transformation from the tapestry image to the right image. Point E (627) is not occluded with displacement value $d_e$. Point F (629) is occluded, and the displacement map (630) moves point F (629) with distance $d_f$. Point F (629) is occluded by the front surface.

The displacement map provides the offset from the tapestry image to either the left or right images. For each scan line, for the LDM, the function $d_L(x)$ can be defined. For the RDM, the function $d_R(x)$ can be defined. For example, starting from the base layer encoding the left view, the value x can be varied from 0 to $W_T-1$ ($W_T$ is the width of the tapestry image), thereby obtaining the new value for the left image. In other words, x can be calculated as $x_L=x+d_L(x)$.

If a pixel $x_1$ in the tapestry image has a value $x_{L1}=x_1+d_L(x_1)$ in the left image, another pixel $x_2$ in the tapestry image has a value $x_{L2}=x_2+d_L(x_2)$ in the left image, and these values for the two pixels are the same, in other words, $x_{L1}=x_{L2}$, then the implication is that either pixel $x_1$ or pixel $x_2$ is occluded. An array of counters can be set up to count the occlusion for each pixel in the left image while scanning. For example, a count for the occluded pixels could be carried as follows:

```
occu_cnt[ 0 ~ W_L -1 ] = {0};
for( x = 0 ; x < W_T-1 ;   x++ ){
    x_L = x + d_L(X)
    occu_cnt[x_L] ++;
}
```

The occlusion pixel count from the left (635) and right (640) view is visible in FIG. 6. As can be seen in FIG. 6, the occluded areas have a pixel count higher than 1. To reconstruct the tapestry image, an inverse displacement operation can be performed, either from the left view or from the right view. In the following, the left view is taken as an example. A similar procedure can be carried out if reconstructing the tapestry image from the right view.

To continue on the next steps of the inverse displacement and interpolation operation of FIG. 6, the pixels have to be shifted from the left view to their location on the tapestry image. A pixel in the tapestry image can be denoted as $p_T(y)$, while a pixel in the left image can be denoted as $p_L(x)$.

A next step in the method is to construct the inverse displacement map (IDM). The inverse displacement map can be created by determining the shifting offset in the left view via the LDM. For example, the following procedure may be used:

```
shift_offset[ 0 ~W_L -1] = { MAX_VALUE };
for( x = 0 ; x < W_T   ; x++ ){
    x_L = x + d_L(x);
    if( (x_L >=0 ) && (x_L <= W_L -1 ) ){   // the pixel should be inside
        the image
        // multiple pixels might be falling to the same x_L location
        // the non-occluded pixel (front pixel) is picked
        if (d_L(x) > shift_offset [x_L ]){
            shift_offset [ x_L ] = d_L(x)
        }
    }
}
```

The inverse displacement maps are shown in FIG. 6, for the left view (645) and the right view (650). As shown in FIG. 6, there is a turning point A (655) with a value jumping from $d_a$ to $d_m$. The inverse displacement value for pixels on the left side (660) of point A (655) has a value $d_a$. The inverse displacement value for pixels on the right side (665) of point A (655) has a value $d_m$. The jump around point A (655) originates from the occluded areas in the left view and the expanded areas in the tapestry image. As can be seen from FIG. 6, there will be a hole after the pixel shifting with width $d_c$ (670).

A next step in the method is to perform a pixel shift. After obtaining the inverse displacement map, a pixel value can be copied from $p_L(x)$ to its corresponding location, $p_T(y)$, as specified in the inverse displacement map (645). For example, the following procedure may be used:

```
for( x = 0 ; x < W_L   ; x++ ){
    if(shift_offset [ x ] != MAX_VALUE ){   // unoccluded pixel
        // copy pixel from left view to the tapestry image
        p_T( x + shift_offset [ x ] ) = p_L( x );
    }
    else{
        p_T( x ) = -1; // pixel to be interpolated later
    }
}
```

The shifted pixel image is shown in FIG. 6 for the left view (665) and the right view (670). As expected, there is a hole after the pixel shift with width $d_c$, (675). This is the area that will be interpolated.

STEP D.2: Interpolation. In some embodiments, interpolation is carried out from the nearest available neighboring pixels. In other embodiments, other methods, such as a hole filling algorithm, may be employed. An example of interpolation from the nearest available neighboring pixels is as follows:

```
for( x = 0 ; x < W_T   ; x++ ){
    if( p_T( x ) == -1) {   // pixel to be interpolated later
        find nearest left pixel s with valid value p_T( s ).
        find nearest right pixel t with valid value p_T( t ).
        if both s and t are available
            // perform linear interpolation.
            p_T( x ) = ( (x-s)/(t-s) ) * p_T( t ) + ( (t-x)/(t-s) ) *
                p_T( s )
        else if only t is available
            // extrapolation
            p_T( x ) = p_T( t )
        else if only s is available
            // extrapolation
            p_T( x ) = p_T( s )
    end
}
// other pixels already have values copied from the left view
```

STEP E: Enhancement layer (EL) generation. In this stage of the method, the difference (535) between the original AST image (511) and the predicted AST image (530) is calculated, obtaining the residual (540). The residual (540) is then quantized using a non-linear quantizer (NLQ, 545). For example, a non-linear quantizer is described in reference [2]. In other embodiments, other non-linear quantizers may be used, as understood by the person skilled in the art. The output of the quantizer (545) can be sent to the EL encoder to generate the EL bitstream (560). For example, the signal can be optionally downsampled (550) and compressed (555), depending on the bitrate. For the compression of the EL (555), standard or proprietary encoders can be used, such as for example H.264, H.265 or other encoders known to the person skilled in the art. Data from the compressed displacement maps (565) can be transmitted as a reference processing unit (RPU) bitstream (580). The RPU can be an interlayer processor. Data from the compressed EL (555) can be transmitted as bitstream (581). Data from the non-linear quantizer (545) can be transmitted as a reference processing unit (RPU) bitstream (582). Data from the SDR-EDR predictor (520) can be transmitted as a reference processing unit (RPU) bitstream (583). Data from the compressed BL (518) can be transmitted as a bitstream (519). All the RPU bitstreams (583, 582, 580) can be any auxiliary bitstream to the BL and EL bitstreams (519, 581). All the bitstreams, auxiliary (583, 582, 580), BL (519) and EL (581), can be multiplexed to be transmitted to a down stream decoder (for example, the decoder of FIG. 8)

Figure 7:
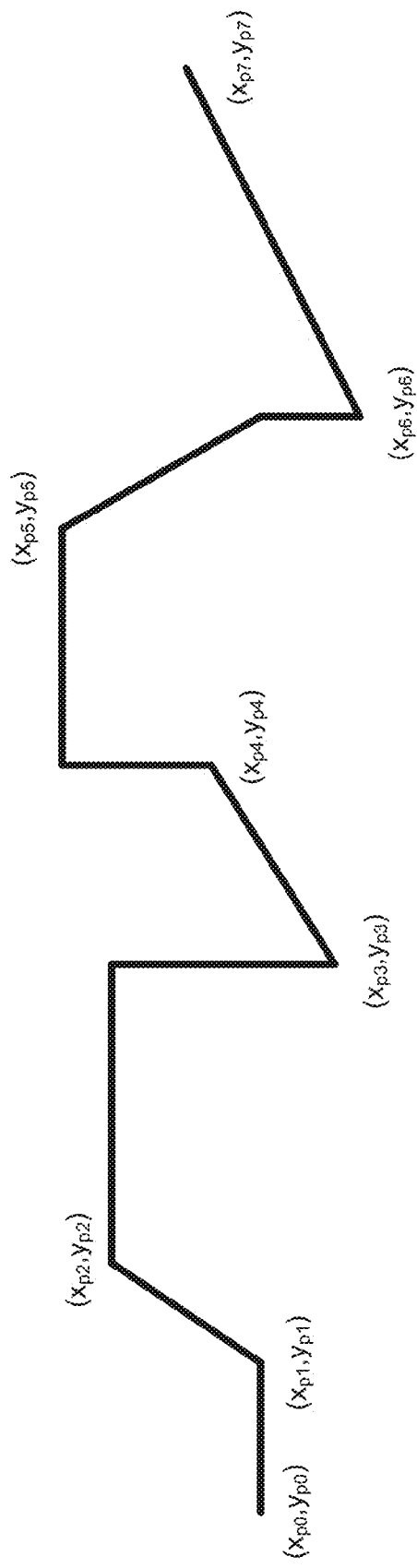
FIG. 7 illustrates an exemplary original scan line in the displacement map.

STEP F: Compression of the displacement map. The displacement map can be compressed (565) to reduce the overhead in the metadata bitstream. FIG. 7 illustrates an exemplary original scan line in the displacement map. As the person skilled in the art will understand from FIG. 7, the displacement curve for one scan line, such as that of FIG. 7, can be described mathematically by a piecewise linear curve. There are several methods available to compress a scan line. Some of these methods are described in the following:

Method 1: Using a curve approximation method. The method comprises different steps, as in the following. The original data can be denoted as $y_n = f(x_n)$, where n is the pixel index and ranges from 0 to N−1, and N is the pixel width of the image. The objective of the method described herein is to find a set of pivot/control points $(x_{ps}, y_{ps})$ to approximate the original curve subject to a maximal tolerance error δ. For example, this method can be summarized as follows:

```
set the maximal tolerance approximation error δ
found_seg = 0;
s = 0;    // segment_idx
x_ps = x_0, y_ps = y_0, k = 0;  // first pivot point
while( found_seg == 0 ) {
        consider all points between (x_ps, y_ps) to (x_ps + k,
        f( x_ps + k ) )
        find optimal polynomial fitting coefficients { a_su }
where u=0,~U (U is the order of polynomial )
        find predicted values
        calculate max error (e) among all predicted values and
        original data
        if((x_ps + k) == (N−1)){   // last pixel,
                x_p,s+1 = x_ps + k
                y_p,s+1 = f(x_p,s+1 )
                s++;
                found_seg = 1;
        }
        elsif ( ( e > δ ) && ( (x_ps + k) != (N−1) ) {   // larger
        than threshold
                x_p,s+1 = x_ps + k − 1
                y_p,s+1 = f( x_p,s+1 ).
                s++;       // increase segment index
                k=0;       // reset counter
        }
        else{     // smaller than threshold, check more pixel
                k++;
        }
}
```

As noted above, the objective of the method is to find a set of pivot/control points. There are several ways to represent these pivot point sets:

a. directly encode control points for each segment (a piecewise linear line)
  i. {($x_{ps}$, f($x_{ps}$)), ($x_{p,s+1}$ −1, f($x_{p,s+1}$ −1)}
  ii. using 4 parameters for the first segment and 2 parameters for the rest of the segments
  iii. it is possible to encode the differential value between x pairs, y pairs b. encode the x pivot points and polynomial coefficients
  i. {$x_{ps}$, {$a_{su}$} where u=0, ~U}
  ii. (1+U) parameters for each segment; for first order polynomial, there are 3 parameters
  iii. it is possible to encode the differential value between x pairs c. The pivot points can be encoded scan line by scan line. Alternatively, differential coding can be used between scan lines, since the difference between nearby lines can be observed to be small. This line difference coding can further reduce the metadata size.

Method 2: Using spline control points. The standard spline method known to the person skilled in the art can be used to describe the displacement curve as well.

Figure 8:
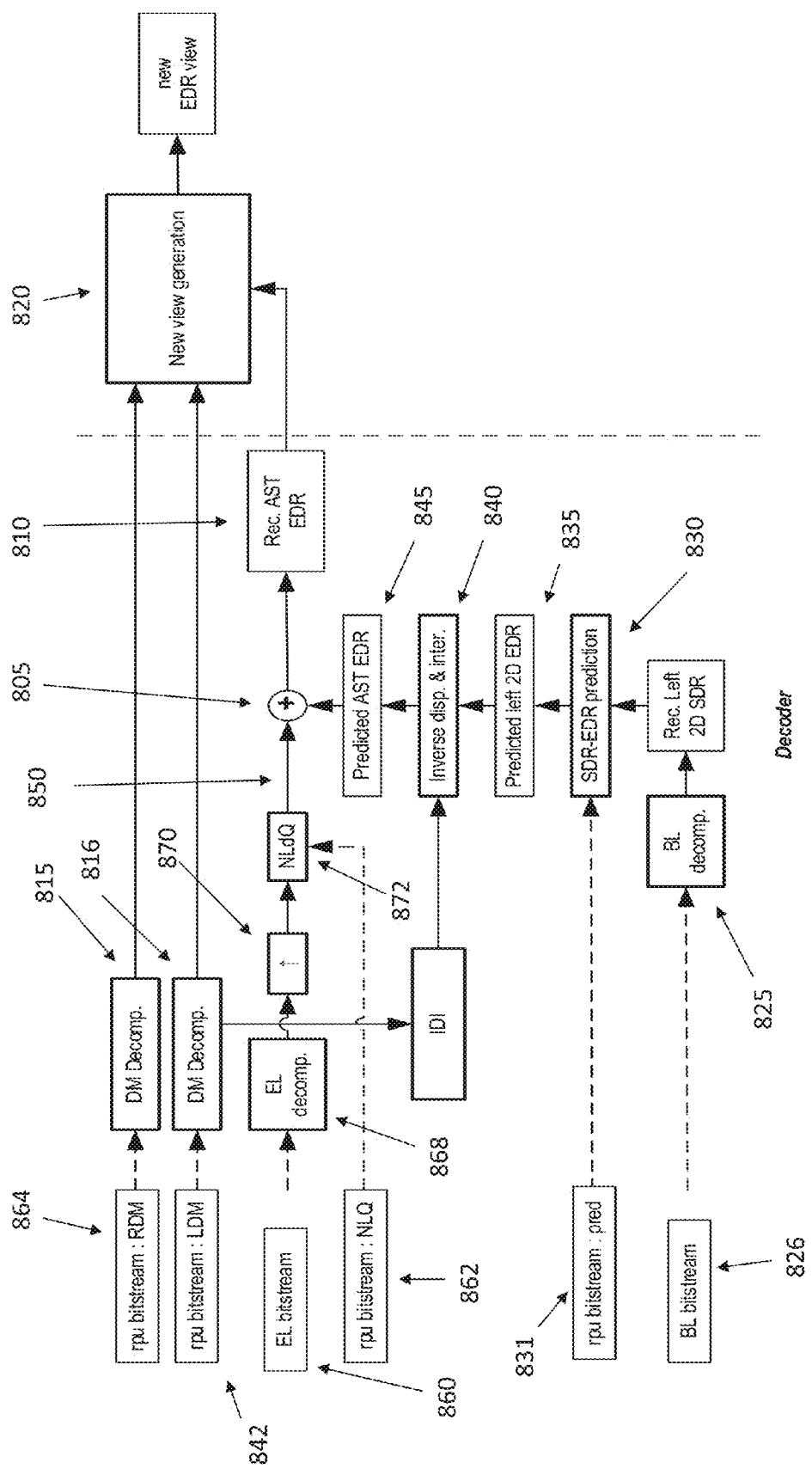
FIG. 8 illustrates an exemplary decoder according to the methods of the present disclosure.

FIG. 8 illustrates an exemplary decoder according to one embodiment of the methods of the present disclosure. As understood by the person skilled in the art, the decoder has several modules that have been described above for the encoder of FIG. 5. The enhancement layer (850) and the predicted EDR AST (845) obtained from the base layer (825) are summed (805) to obtain the EDR tapestry image (810), which together with the displacement maps (815, 816) allows the generation of images from a desired point of view (820).

Once a legacy device receives the BL bitstream (826), it can directly output the 2D SDR image (825) to any legacy TV capable of displaying SDR images. For the case of an EDR AST device, the EDR AST device will first take the decompressed BL (825) and apply a prediction operation (830), to obtain the predicted 2D EDR, for example the left predicted 2D EDR (835). This prediction operation can use prediction metadata (831) provided by the encoder, for example in a RPU bitstream (831).

Subsequently, the inverse displacement map (IDM) is derived from the displacement map, for example from the LDM (842). The LDM may be provided by an encoder, for example through a RPU bitstream (842); similarly, the encoder may also provide a RPU bitstream for the RDM (864). Continuing from the left predicted 2D EDR (835), the pixels are shifted and interpolated (840) based on the predicted 2D EDR image (835), thereby obtaining the shifted/interpolated/predicted EDR tapestry image (845). After adding (805) the residual (850) from the enhancement layer bitstream (860), the AST EDR tapestry image (810) is obtained. The residual (850) may be obtained after decompression (868) of the EL bitstream (860). If the EL bistream was downsampled at the decoder, the decompressed EL (868) may be upsampled (870). Subsequently, a non-linear dequantizer operation (872) may be applied, using parameters provided by a RPU NLQ bitstream (862).

To obtain a desired view, for example for 3D viewing, view synthesis (820) can be carried out, from the AST EDR tapestry image (810), based on the information provided in the LDM and RDM (815, 816). In some embodiments, the view synthesis is carried out based on the methods explained in reference [1].

I.2 2D SDR Backward-Compatibility: Two-Step EDR with Subsequent Tapestry (EFTL)

In some applications, obtaining backward compatibility may be carried out into 2 separate steps. In such a way, the scalability of the method has greater flexibility or granularity. In some embodiments, 2D SDR compatibility is carried out after obtaining the BL bitstream. Subsequently, the first layer of the EL can be added to obtain 2D EDR compatibility. AST EDR compatibility can then be obtained by adding the second layer of the EL. In other words, in this embodiment the method corresponds to a 3-layer codec. This method may also be termed EDR first, tapestry later (EFTL), because, in this embodiment, the EDR compatibility is processed before the generation of the AST image.

Figure 9:
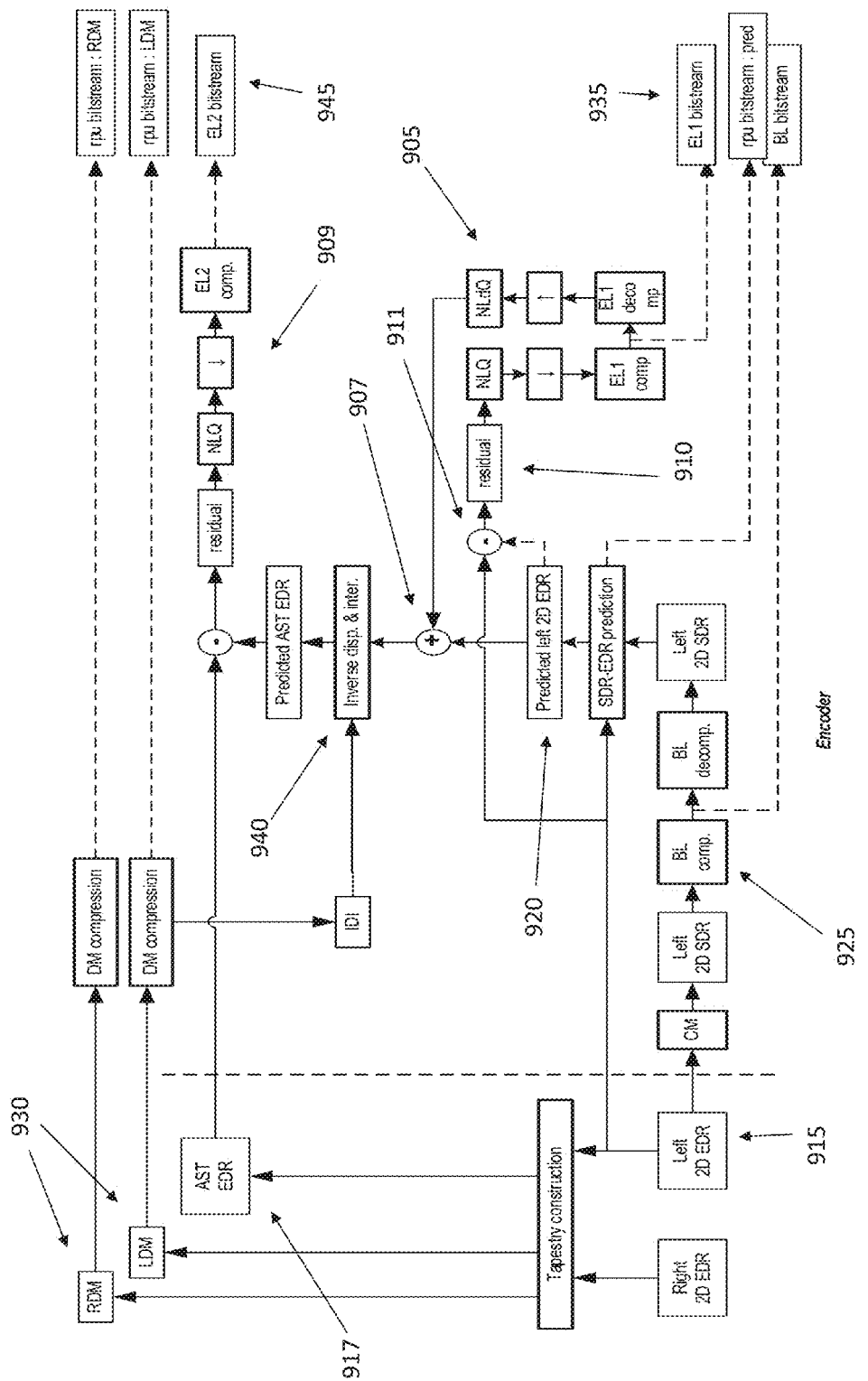
FIG. 9 illustrates an exemplary encoder according to an embodiment of the disclosure with a two-step compatibility method.

FIG. 9 illustrates an exemplary encoder according to an embodiment of the disclosure, and according to the two-step compatibility method explained in this section. As understood by the person skilled in the art, some of the modules in FIG. 9 are the same as those illustrated in FIG. 5, which illustrated a one-step architecture. The two-step architecture of FIG. 9 arranges the execution order of some operations in a different way. One difference between FIG. 9 and FIG. 5 is the fact that the first enhancement layer becomes in-loop in FIG. 9; that is, the first EL bitstream (910), in this embodiment, is decoded (905) and added back (907) before processing the second layer encoding (909). One purpose of looping the first EL into the second EL is to avoid drifting.

As can be noted by a comparison of FIG. 5 and FIG. 9, some steps of the two embodiments are the same. Namely, the operations to obtain the base layer (925) starting from the left EDR original view image (915) up to the prediction of the left 2D EDR image (920) is the same in the two embodiments. Similarly, the generation of the original autostereo tapestry image (917) and displacement maps (930) is the same. However, in the embodiment of FIG. 9, a difference is calculated (911) between the predicted left 2D EDR image (920) and the left EDR original view image (915), obtaining the residual (910). The residual (910) is then encoded into the first EL bitstream (935). The encoded residual (910) is also decoded (905) to the added (907) to the predicted left 2D EDR image (920), before applying an inverse displacement and interpolation operation (940), similarly to the embodiment of FIG. 5. The residual (909) from the tapestry image (917) is then calculated similarly as to the embodiment of FIG. 5, obtaining a second EL bitstream (945).

Figure 10:
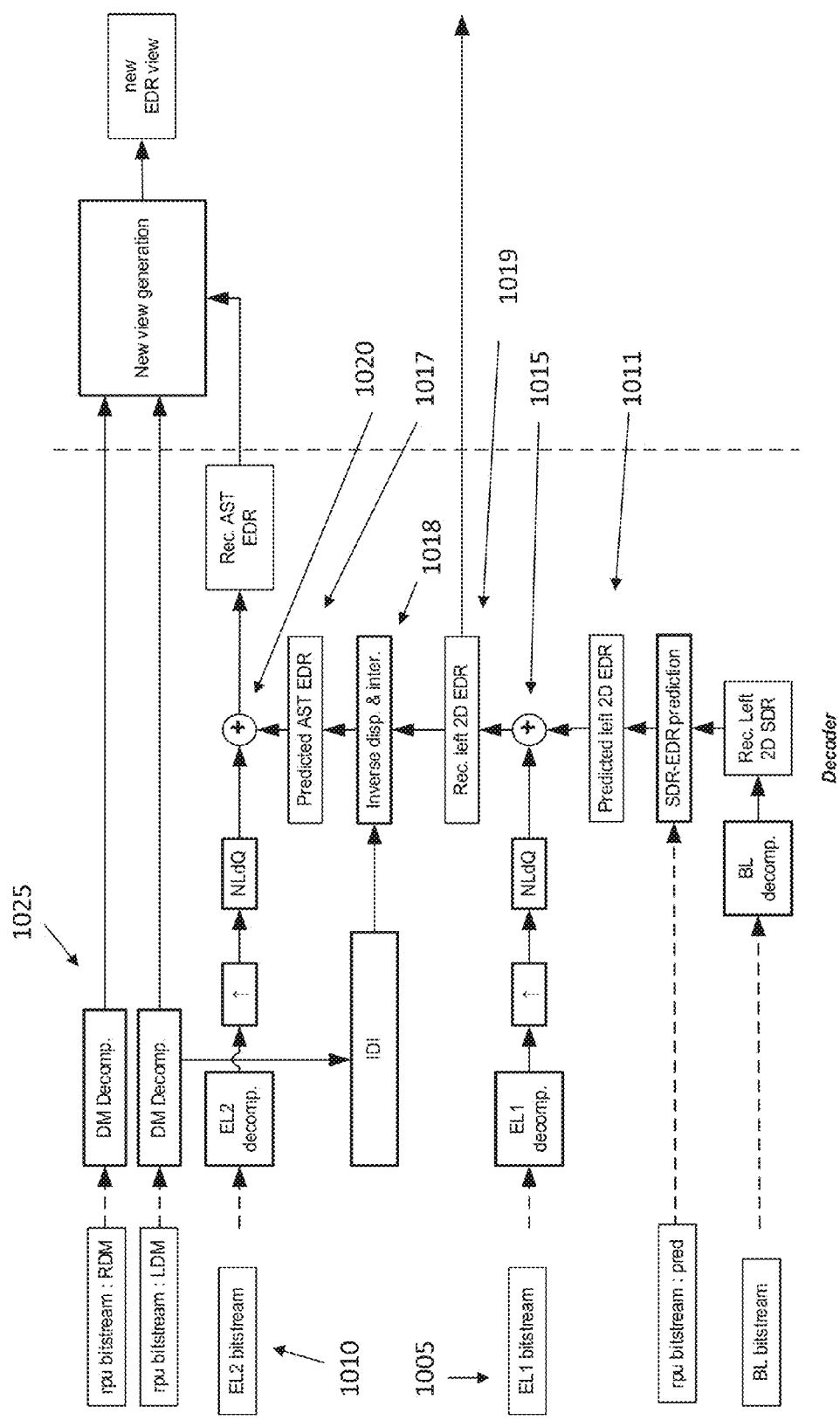
FIG. 10 illustrates an exemplary decoder side for the encoder embodiment of FIG. 9.

FIG. 10 illustrates an exemplary decoder side for the encoder embodiment of FIG. 9. It can be noted that two EL bitstreams (1005, 1010) are employed. A first residual from the first EL bitstream (1005) is added (1015) to the predicted 2D EDR image (1011), for example the left 2D EDR image. Subsequently, a second residual from the second EL bitstream (1010) is added (1020) to the predicted AST EDR image (1017). The predicted AST EDR image (1017) is obtained by inverse displacement and interpolation (1018), similarly to the embodiment of FIG. 8, and based on the displacement maps (1025).

In some embodiments, the high efficiency video coding (HEVC) tile coding format may be available. In these embodiments, the first and second EL bitstreams may be merged into one single EL bitstream.

I.3 2D SDR Backward-Compatibility: Two-Step Tapestry with Subsequent ER (TFEL)

In some embodiments, the AST SDR image can be obtained as a first step (instead of the EDR image as in the previous embodiment), generating or receiving a first EL bitstream. Subsequently the AST EDR image can be obtained based on a second EL bitstream. Since, in this embodiment, the AST image is obtained first, before obtaining the EDR compatibility, this method may also be termed tapestry first, EDR later (TFEL). In other words, the order for obtaining the AST image and the EDR image is inversed, compared to the previous embodiment, the EFTL method.

One difference between the TFEL and the EFTL methods is that, for the TFEL method, the AST EDR image needs to be content mapped (CM) to a AST SDR image. As visible in FIG. 11, the content mapping (CM) operation (1105) is necessary to generate the residual (1110) between the AST SDR image (1115) and the interpolated AST SDR image (1120). Thus, there can be an extra CM computation in the encoder side, in the TFEL embodiment of FIG. 11 compared to the EFTL embodiment of FIG. 9.

Figure 11:
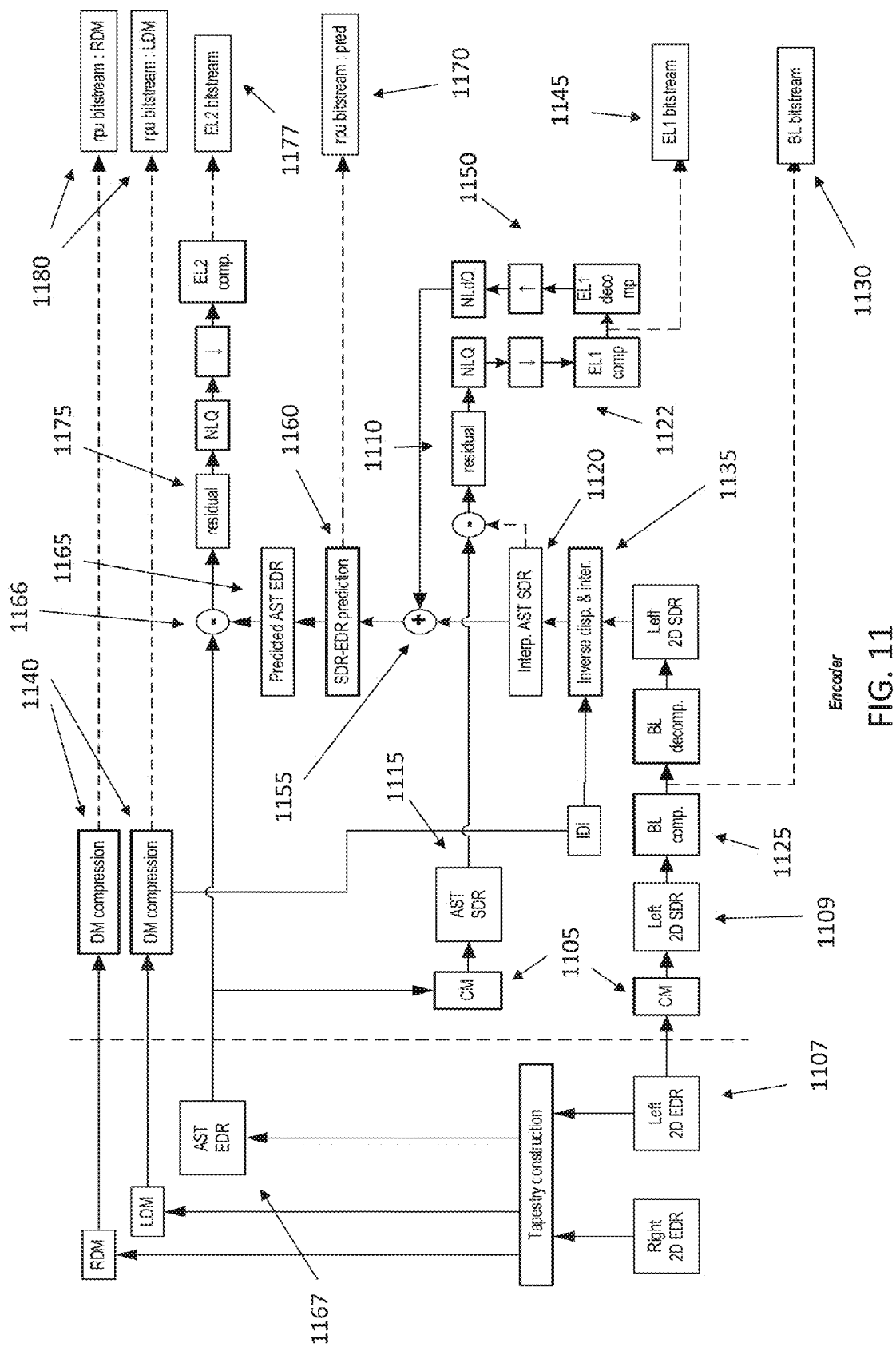
FIG. 11 illustrates an exemplary encoder based on the TFEL method.
Figure 12:
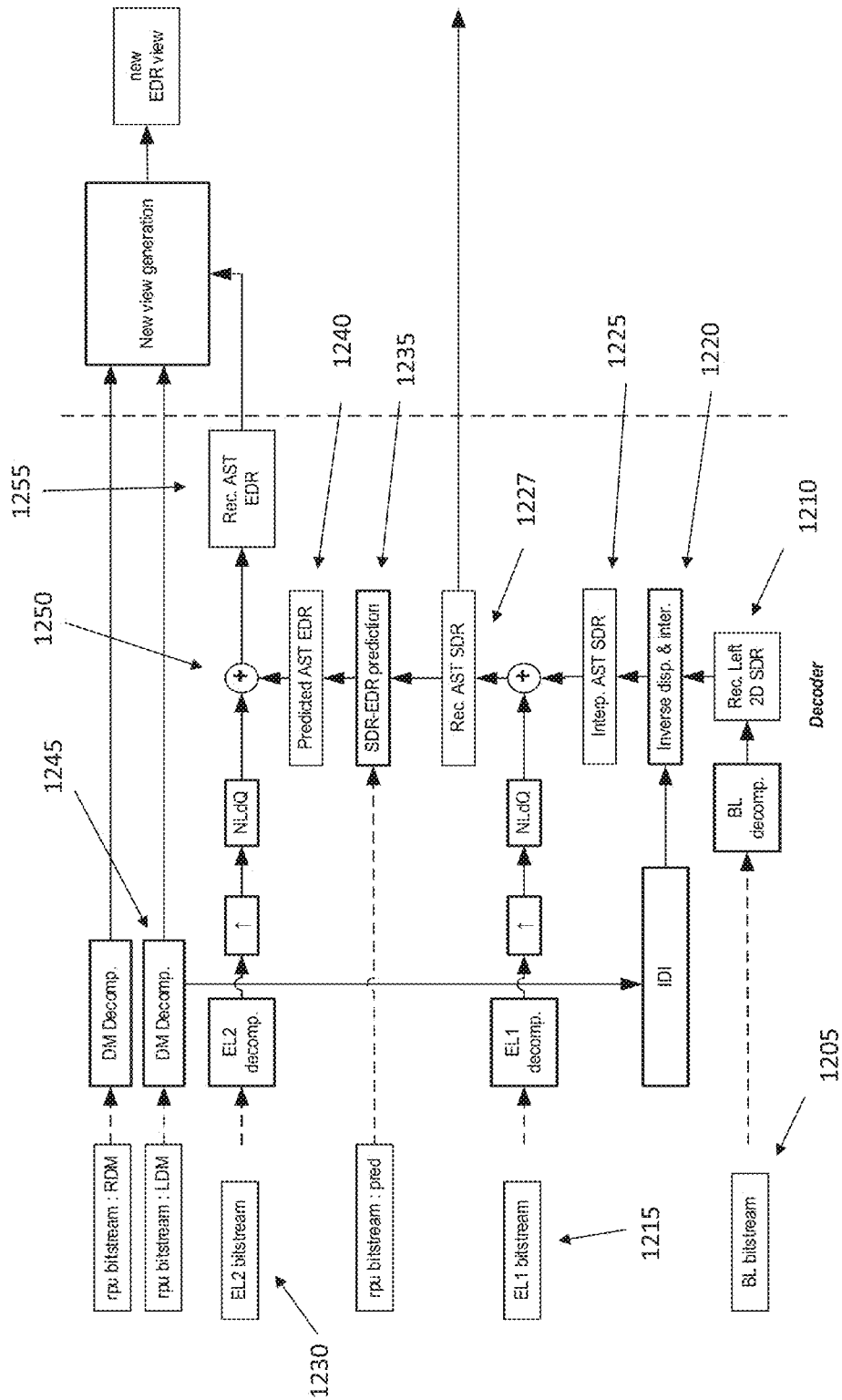
FIG. 12 illustrates an exemplary decoder corresponding to the method of FIG. 11.

FIG. 11 illustrates an exemplary encoder based on the TFEL method, while FIG. 12 illustrates an exemplary corresponding decoder with the TFEL method. In some embodiments, if the HEVC tile coding format operation is available, the first and second EL bitstreams can be merged into one single EL bitstream.

As can be seen from FIG. 11, several modules are substantially the same as the previous embodiment of FIG. 9, with the exception of the CM operation, and a different order of execution for some components. The left 2D EDR image (1107) is content mapped (1105) to obtain a left 2D SDR image (1109). The left 2D SDR image (1109) can be compressed (1125) and transmitted as a base layer (1130). After compression (1125), the left 2D SDR image can be decompressed and an inverse displacement and interpolation operation can be applied to it, based on the left and right displacement maps (1140). The inverse displacement and interpolation operation can be similar to the inverse displacement and interpolation operations of previous embodiments.

The residual (1120) can be encoded (1122) and transmitted as a first EL bitstream (1145). For example, a non-linear quantizer, downsampler and compression module may process the residual (1120) before transmission. The encoded residual (1122) may be decoded (1150) and then added (1155) to the interpolated AST SDR image (1120). A prediction operation (1160) may be applied to the interpolated AST SDR image (1120), thus obtaining a predicted AST EDR image (1165). The prediction parameters may be transmitted as metadata (1170).

A second residual (1175) can be calculated by taking the difference (1166) between the predicted AST EDR image (1165) and the original AST EDR image (1167). The residual (1175) may be encoded and transmitted as a second EL layer (1177). The left and right displacement maps (1140) can be transmitted as additional bitstreams (1180). In some embodiments, the bitstreams from the different operations can be integrated in a single bitstream.

As can be understood by the description of FIG. 11 above, a difference between the embodiment of FIG. 9 and that of FIG. 11 is that the SDR to EDR prediction in FIG. 9 is carried out on a leftmost view image. Instead, in FIG. 11 the SDR to EDR prediction is carried on a tapestry image.

FIG. 12 illustrates several operations at the decoder, corresponding to the encoding method of FIG. 11. Several modules can be similar to those of FIG. 11, with the necessary differences understood by the person skilled in the art between encoding and decoding operations. The BL bitstream (1205) can be decoded to obtain a left view 2D SDR image (1210).

An inverse displacement and interpolation operation (1220) can be applied to the left view 2D SDR image (1210) based on the decompressed LDM (1245), thus obtaining an interpolated AST SDR image (1225). The first EL bitstream (1215) can be decoded and summed to them interpolated AST SDR image (1225) to obtain the AST SDR image (1227). An SDR to EDR prediction (1235) can be applied to the AST SDR image (1227), thus obtaining a predicted AST EDR image (1240). Subsequently, the second EL layer (1230) can be added (1250) to the predicted AST EDR image (1240), thus obtaining the AST EDR image (1255).

II. 2D SDR Backward-Compatibility to Central View

In this section, the backward-compatible architecture relating to the central view is described.

II.1 Basic Input and Output

In some embodiments, the base layer may contain the central (preferred) view, instead of a left or right view. In these embodiments, direct backward compatibility to the central view is already present. In these embodiments, during the tapestry image construction process, three inputs may be taken: the left view, the central view, and the right view. Three different outputs may be as in the following.

1. Autostereo tapestry (AST) EDR image,
2. Left displacement map (LDM): The left displacement map records the pixel offsets needed in the transformation from the tapestry image to the left image. The dimensions of the LDM are identical to those of the AST image, describing the movement for each pixel in auto stereoscopy.
3. Right displacement map (RDM): The right displacement map records the offsets needed in the transformation from the tapestry image to the right image. The dimensions of the RDM are identical to those of the AST image, describing the movement for each pixel in auto stereoscopy.

Figure 13:
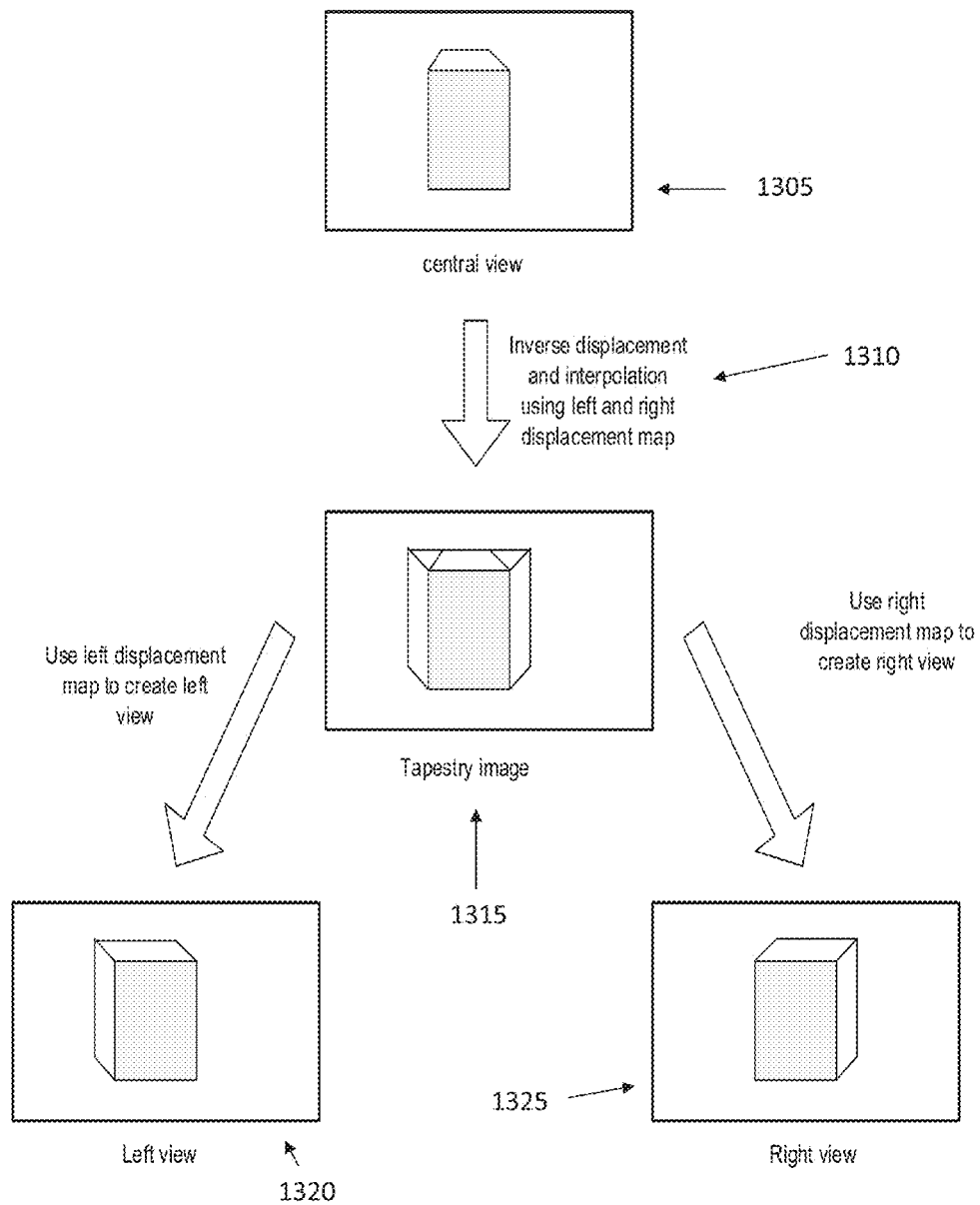
FIG. 13 illustrates an exemplary algorithm for compatibility to the central view.

FIG. 13 illustrates an exemplary algorithm for compatibility to the central view. The base layer contains the central view in the SDR domain (1305). An inverse displacement and interpolation operation (1310) can be applied based on the LDM and RDM, thus obtaining the tapestry image (1315). The left view (1320) and right view (1325) images can then be reconstructed. To construct the EDR tapestry image, a first step is to perform the prediction from SDR to EDR for the central view. Subsequently, the EDR central view can be predicted.

II.2. 2D EDR to AST EDR Inverse Displacement and Interpolation (IDI)

After prediction of the EDR image from the SDR image, the next step is to create a predicted EDR tapestry image via inverse displacement and interpolation (IDI). The inverse displacement and interpolation operations for the methods for backward compatibility for the central view can be applied similarly to the methods for backward compatibility to left view or right view described above in the present disclosure. The inverse displacement and interpolation operations can be implemented by first obtaining the inverse displacement map (IDM) and then performing the interpolation. The way to construct the IDM for the central view can be considered as a superset method for the left-view. The IDM can be constructed via both the LDM and the RDM.

STEP A: Construct the central view inverse displacement map (IDM). The central view inverse displacement map (IDM) can be created by determining the shifting offset from both the LDM and the RDM. A metadata "F" can be used to specify the location of the preferred/central view between the left view and the right view.

$W_C$ is the width of the central view image. $W_T$ is the width of the tapestry image. The pixel in the tapestry image can be denoted as $p_T(y)$. The pixel in the central image can be denoted as $p_C(x)$. An exemplary algorithm is as follows.

```
shift_offset[0 ~W_C -1] = { MAX_VALUE };
    for( x = 0 ; x < W_T    ; x++ ){
        d_C(x) = (1-F)d_L(x) + F d_R(x) ;
        x_C = x + d_C(x) ;
        if( (x_C >=0 ) && (x_C <= W_C -1 ) ){    // the pixel should be inside
            the image
            // multiple pixels may fall to the same x_C location
            // the non-occluded pixel (front pixel) is picked
```

```
            d(x) = d_L(x) - d_R(x) ;
            if(d(x) > shift_offset [x_C ] ){
                shift_offset [ x_C ] = d(x)
            }
        }
    }
}
```

STEP B: Perform pixel shifting. After obtaining the inverse displacement map, the pixel value from $p_C(x)$ can be copied to its corresponding location, $p_T(y)$, as specified in the inverse displacement map. An exemplary algorithm is as follows.

```
for( x = 0 ; x < W_C    ; x++ ){
        if(shift_offset [ x ] != MAX_VALUE ){    // un-occluded pixel
            // copy pixel from the left view to the tapestry image
            p_T( x + shift_offset [ x ] ) = p_C( x );
        }
        else{
            p_T( x ) = -1; // pixel to be interpolated later
        }
}
```

Interpolation can be done in the same way as for the backward compatible methods relating to the left/right view described above in the present disclosure.

As in the methods for backward compatibility to the left/right view, the residual difference between the original EDR tapestry is included in the enhancement layer. The tapestry image, predicted from SDR to EDR, and interpolated from the central view to the tapestry image, is also included in the enhancement layer.

II.3 Codec Architecture

Figure 14:
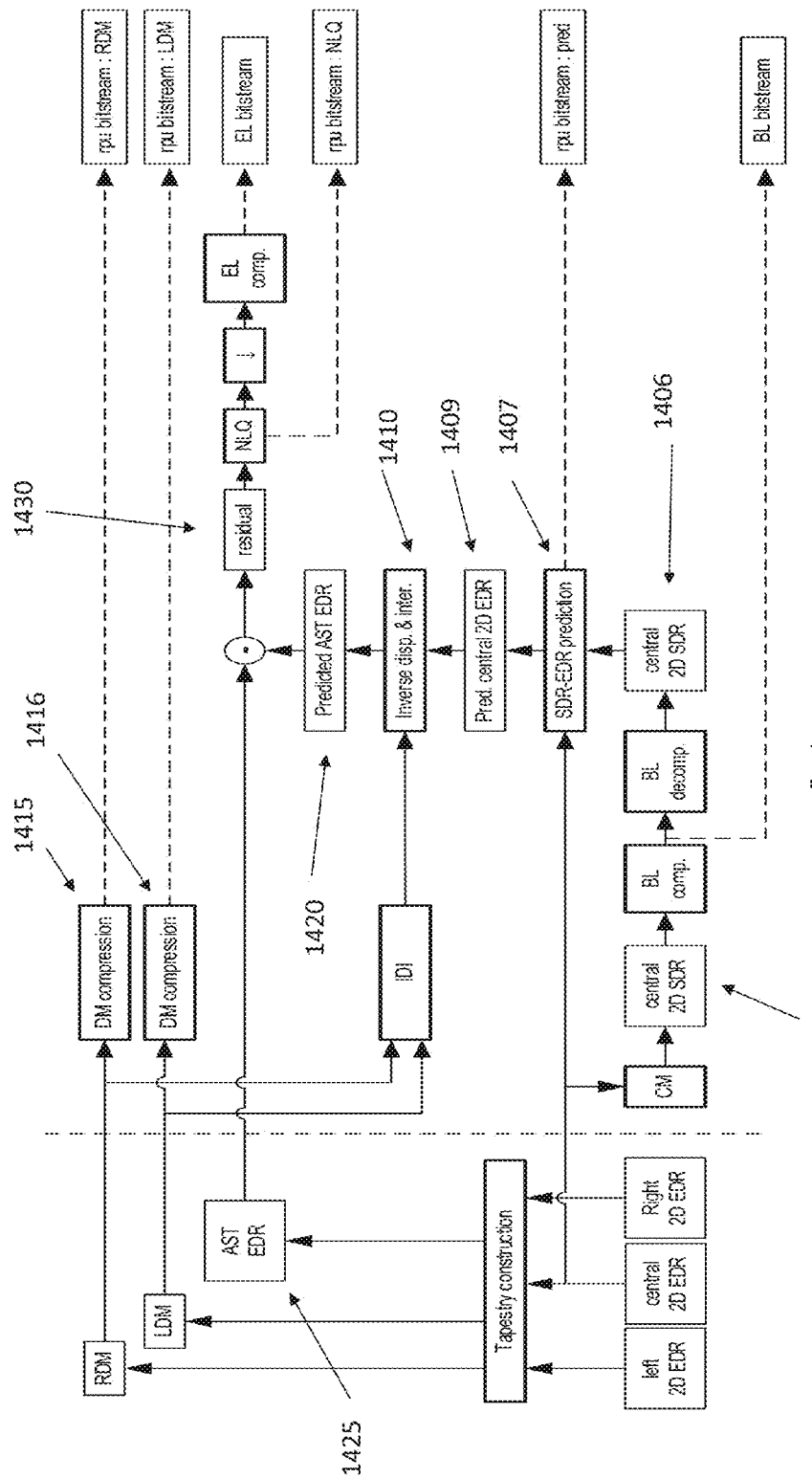
FIG. 14 illustrates an exemplary encoder for the methods for backward compatibility for the central view.
Figure 15:
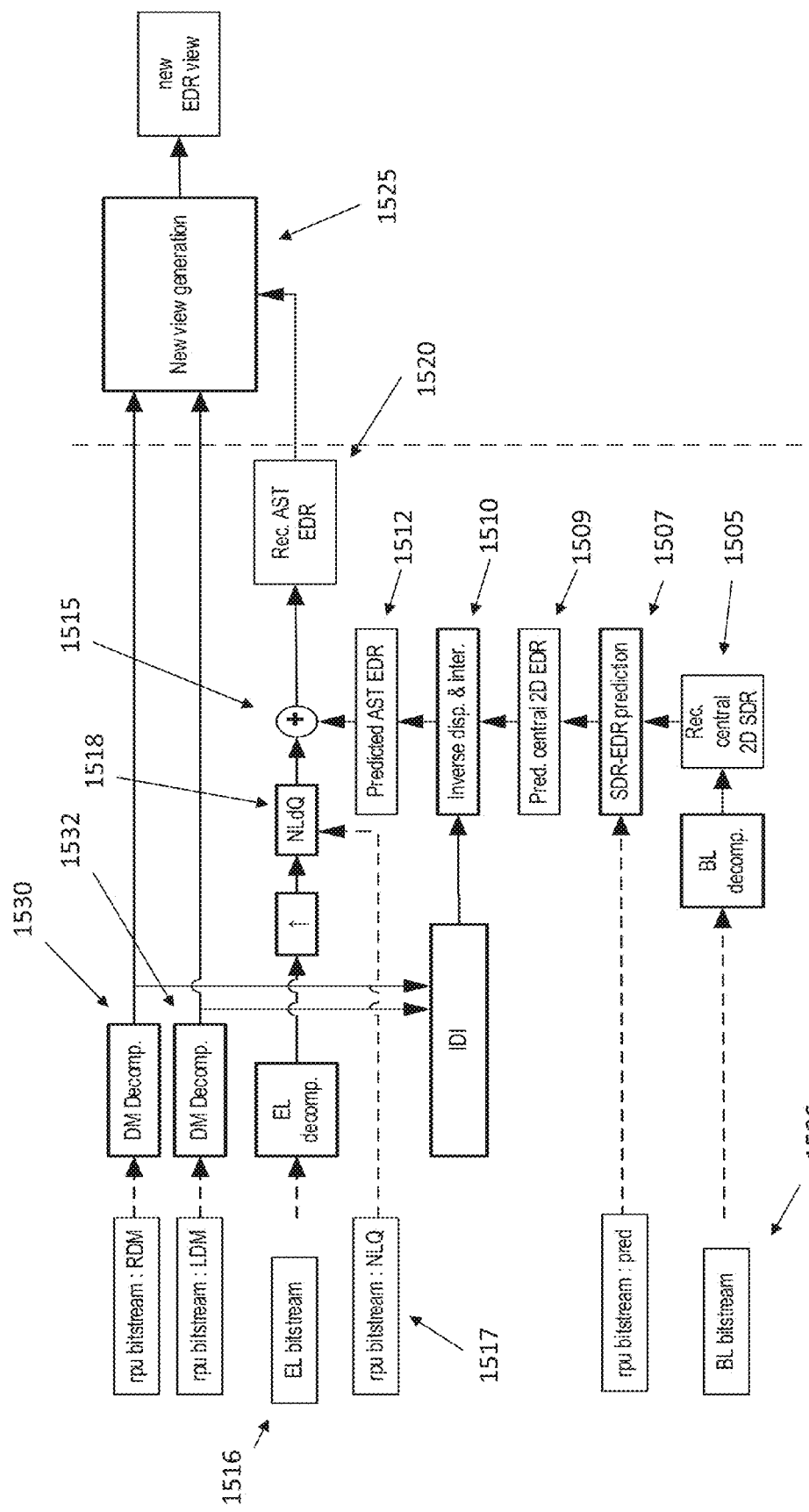
FIG. 15 illustrates an exemplary decoder for the methods of FIG. 14.

An exemplary encoder for the methods for backward compatibility for the central view is illustrated in FIG. 14. FIG. 15 illustrates an exemplary decoder for the methods of FIG. 14.

As visible in FIG. 14, the base layer is a SDR central view image (1405). A prediction operation (1407) generates the central view EDR predicted image (1409). In a next step, the inverse displacement and interpolation operation is applied (1410), based on the displacement maps (1415, 1416), thus obtaining the predicted AST EDR image (1420). A residual (1430) can be calculated as the difference between the original AST EDR image (1425) and the predicted AST EDR image (1420).

FIG. 15 illustrates a corresponding decoder. The SDR central view image (1505) is obtained from the base layer (1506). After the SDR to EDR prediction (1507), the predicted central view is obtained for the EDR domain (1509). Subsequently, the inverse displacement and interpolation operation is applied (1510), based on the left and right displacement maps (1530, 1532), thus obtaining the predicted AST EDR image (1512). In a next step, the enhancement layer bitstream (1516) is decoded, and dequantized (1518) based on the NLQ metadata parameters (1517). The decoded enhancement layer is added (1515) to the predicted EDR autostereo tapestry image (1512), obtaining the reconstructed EDR AST image (1520) ready for the generation of new views (1525). The left and right views, for example, can be generated based on the EDR AST image (1520) and the left and right displacement maps (1530). Other new views can also be generated using the existing tapestry reconstruction algorithm, as described for example in reference [1].

III. Non Backward-Compatible Architecture

In this section, the non backward-compatible architecture is described. This architecture provides as output a non backward-compatible version of the AST EDR image. In some embodiments, the EDR signal cannot be covered by a single 8-bit codec, due to the high dynamic range of the EDR images. Using an 8-bit codec could result in contouring artifacts or blocky artifacts. In some embodiments, reshaping methods can be employed for the EDR signal, for example using a dual 8-bit system such as the system described in reference [3].

Figure 16:
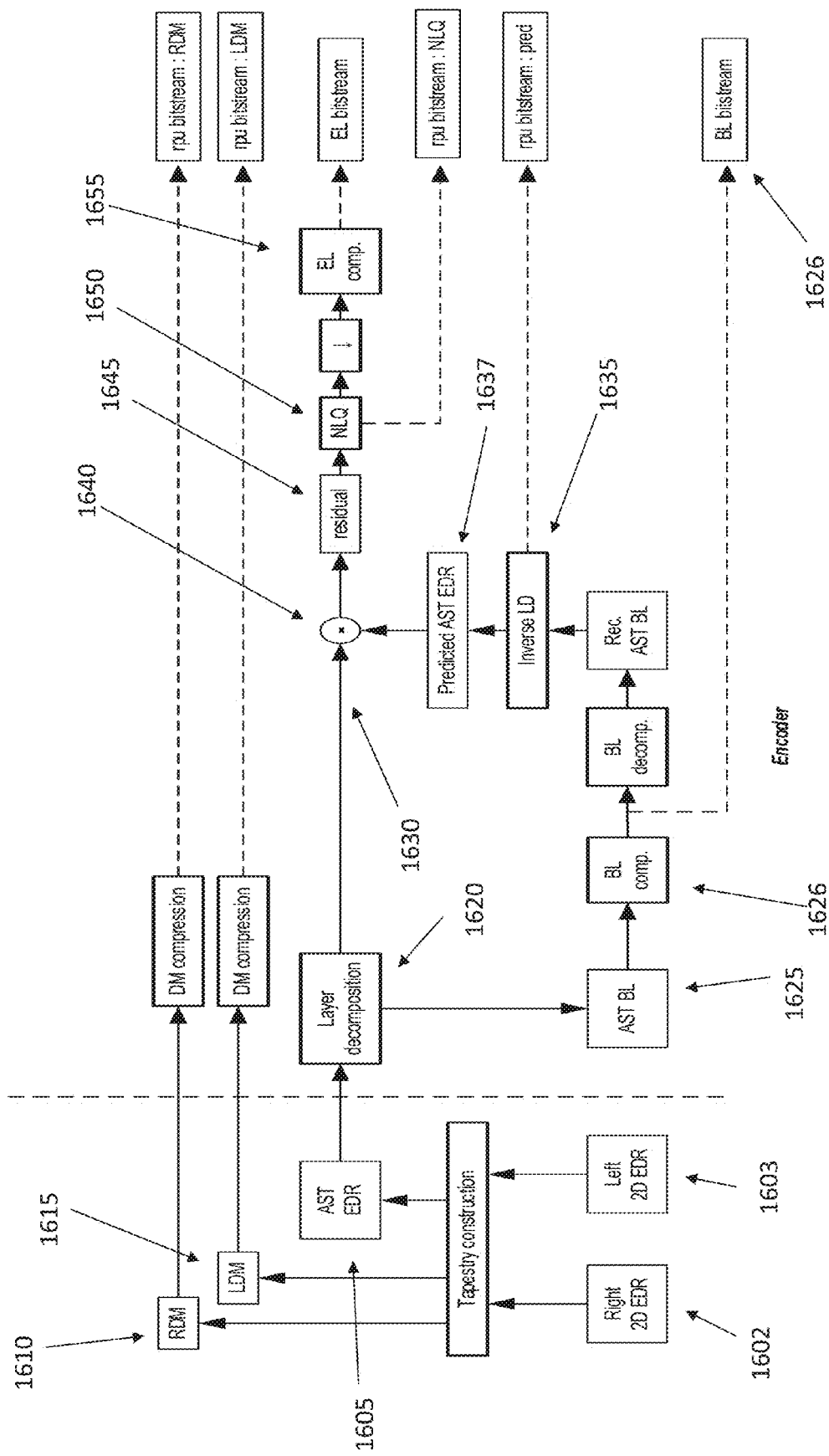
FIG. 16 describes an exemplary embodiment of an encoder for a non-backward-compatible architecture.

FIG. 16 describes an exemplary embodiment of an encoder for a non-backward-compatible architecture. In FIG. 16, the base layer (1625, 1626) is not meant to be shown to the end user, it is merely used during calculations at the encoder or decoder. Only the final combined video is available to be viewed in EDR devices (such as an EDR TV). Exemplary steps for the encoding method of this section comprise the following steps.

STEP A: Tapestry Image Construction. The AST EDR image or video (1605), the left displacement map (LDM, 1615), and the right displacement map (RDM, 1610) are generated, as visible in FIG. 16, based on the left view 2D EDR image (1603) and the right view 2D EDR image (1602). In this embodiment, the inverse displacement and interpolation operations are not applied.

STEP B: Layer Decomposition. Layer decomposition (LD, 1620) can comprise applying a non-linear function to re-quantize the input EDR signal (1605) and separate it into multiple layers. For example, for a 2-layer codec, LD module can output dark and midtone areas to the BL (1625) and bright areas to the EL (1630). In this example, the BL (1625) contains the dark/midtone areas of the AST EDR image (1605) and has the same dimensions of the AST image (1605).

STEP C: Base Layer Compression. In some embodiments, the BL can be compressed (1626) by the appropriate codec as understood by the person skilled in the art; for example, a legacy codec with a bigger dimension could be used.

STEP D: Enhancement Layer Generation and Compression. After decompressing the compressed BL (1626), an inverse LD operation (1635) can be performed to reconstruct the dark/midtone areas thus obtaining a predicted AST EDR image (1637). Subsequently, the reconstructed areas, or the predicted AST EDR image (1637), are subtracted (1640) from the original AST EDR signal (1605) to obtain the residual (1645). The residual (1645) is then received by the non-linear quantizer (NLQ) module (1650). The resulting signal can then be compressed for transmission by the EL compression module (1655). In some embodiments, the BL may have a sufficient bit depth (for example, 10 bits) to comprise information about the dark, midtone and bright areas. In these cases, there is then no need to use a EL as the brightness information can be transmitted through the BL.

Figure 17:
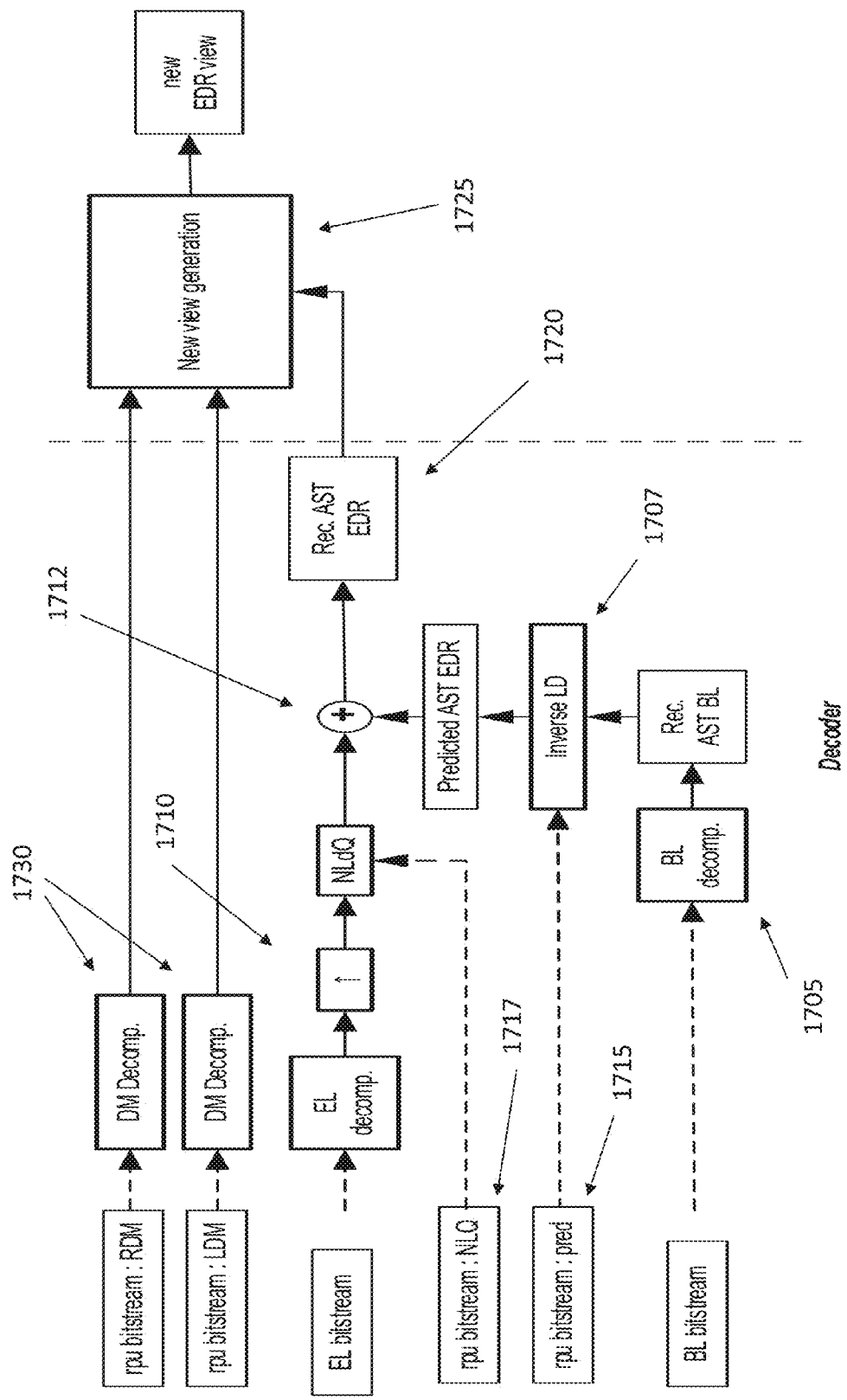
FIG. 17 describes an exemplary embodiment of a decoder for a non-backward-compatible architecture.

As understood by the person skilled in the art, at the decoder side several operations are applied, similarly to those at the encoder side, albeit in inverted order where applicable for performing a decoding rather than encoding operation. As visible in FIG. 17, an exemplary decoder for a non-backward-compatible architecture comprises the following steps. The BL is decompressed (1705) and an inverse layer decomposition operation is applied (1707) based on the metadata (1715). The EL (1710) is decoded based on the NLQ metadata (1717). The decoded EL is added (1712) to the predicted AST EDR image for composing the reconstructed AST EDR image (1720). New views can be generated (1725) from the reconstructed AST EDR (1720), based on the displacement maps (1730).

In the present disclosure, different architectures have been described to support AST EDR with or without backward compatibility. The 2D image can be shifted and interpolated to the AST image to then obtain the residual. The metadata to assist the shifting and interpolation operations have been described. Methods are also described to encode a displacement map. A general architecture to encode a preferred view, such as a central view, in the base layer BL is also described in the present disclosure.

In some embodiments, the methods of the present disclosure apply to a first view, which can be a left view, which is a view left of the center of a 3D image. In other embodiments, the first view is a leftmost, which is a view substantially close to the leftmost part of an image. The first view could also be a right view, or a rightmost view. In some embodiments, a first and second view may be used, where the first view is a left view, a leftmost view, a right view or a rightmost view, and the second view is an opposite view to the first view. For example, if the first view is a left view, the second view would be opposite to the first view with respect to the center of the image, therefore the second view would be a right view.

In some embodiments of the present disclosure, a left view or a right view has been utilized, while other embodiments have been described using a central view. The person skilled in the art will understand that any method of the present disclosure can be used with a central view, a left view, a right view, or any desired view.

Figure 18:
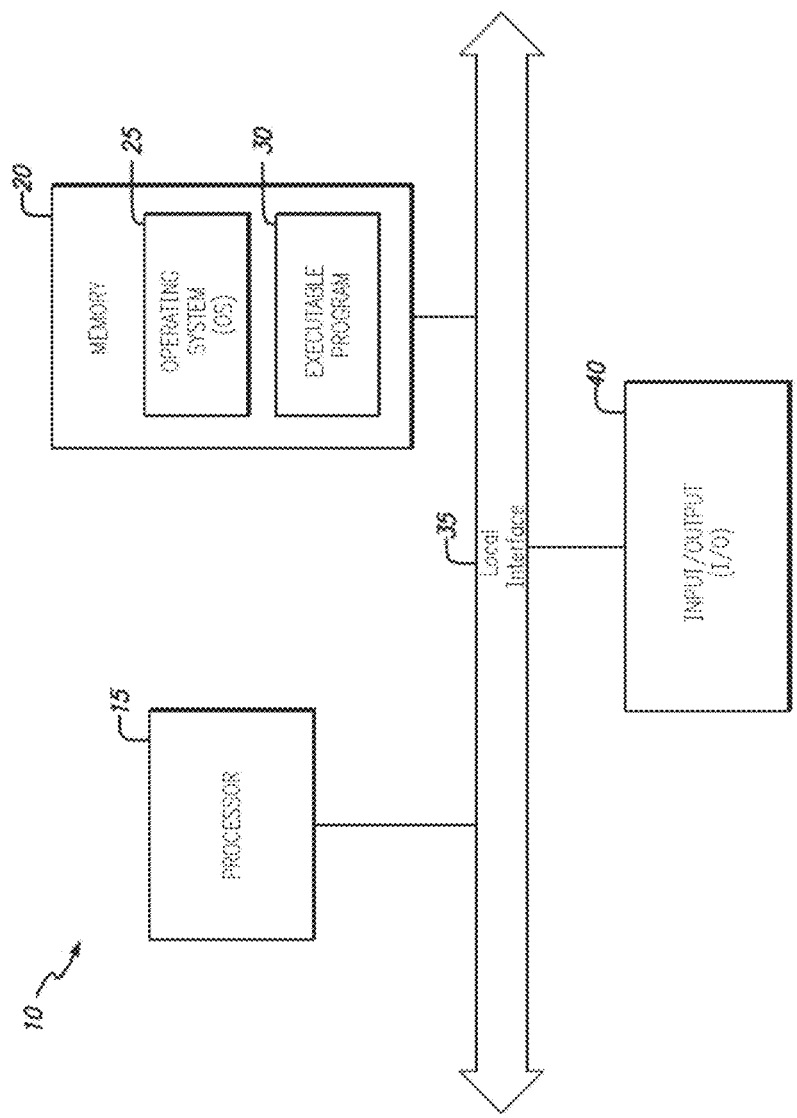
FIG. 18 depicts an exemplary embodiment of a target hardware for implementation of an embodiment of the present disclosure.

FIG. 18 is an exemplary embodiment of a target hardware (10) (e.g. a computer system) for implementing the embodiment of FIGS. 1-17. This target hardware comprises a processor (15), a memory bank (20), a local interface bus (35) and one or more Input/Output devices (40). The processor may execute one or more instructions related to the implementation of FIGS. 1-17, and as provided by the Operating System (25) based on some executable program stored in the memory (20). These instructions are carried to the processors (20) via the local interface (35) and as dictated by some data interface protocol specific to the local interface and the processor (15). It should be noted that the local interface (35) is a symbolic representation of several elements such as controllers, buffers (caches), drivers, repeaters and receivers that are generally directed at providing address, control, and/or data connections between multiple elements of a processor based system. In some embodiments the processor (15) may be fitted with some local memory (cache) where it can store some of the instructions to be performed for some added execution speed. Execution of the instructions by the processor may require usage of some input/output device (40), such as inputting data from a file stored on a hard disk, inputting commands from a keyboard, outputting data to a display, or outputting data to a USB flash drive. In some embodiments, the operating system (25) facilitates these tasks by being the central element to gathering the various data and instructions required for the execution of the program and provide these to the microprocessor. In some embodiments the operating system may not exist, and all the tasks are under direct control of the processor (15), although the basic architecture of the target hardware device (10) will remain the same as depicted in FIG. 18. In some embodiments a plurality of processors may be used in a parallel configuration for added execution speed. In such a case, the executable program may be specifically tailored to a parallel execution. Also, in some embodiments the processor (15) may execute part of the implementation of FIGS. 1-17, and some other part may be implemented using dedicated hardware/firmware placed at an Input/Output location accessible by the target hardware (10) via local interface (35). The target hardware (10) may include a plurality of executable program (30), wherein each may run independently or in combination with one another.

The examples set forth above are provided to those of ordinary skill in the art a complete disclosure and description of how to make and use the embodiments of the gamut mapping of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The methods and systems described in the present disclosure may be implemented in hardware, software, firmware or any combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

A number of embodiments of the disclosure have been described. Nevertheless, it will be understood that various modifications may be made without departing from the spirit and scope of the present disclosure. Accordingly, other embodiments are within the scope of the following claims.

The present disclosure contains a list of references, the disclosure of all of which is incorporated herein by reference in their entirety.

REFERENCES

[1] U.S. patent application Ser. No. 14/309,965, "Autostereo Tapestry Registration," filed on Jun. 20, 2014.

[2] PCT Application Ser. No. PCT/US2013/073085, "Backward-Compatible coding for Ultra High Definition Signals with Enhanced Dynamic range," filed on Dec. 4, 2013.

[3] PCT Application Ser. No PCT/US2014/042583, "Adaptive Reshaping for Layered Coding of Enhanced Dynamic Range Signals," filed on Jun. 16, 2014.

What is claimed is:

1. A computer-based method comprising:
providing an original first view image of a scene at a first dynamic range;
providing an original second view image, different than the original first view image, of the scene;
creating an original autostereoscopic or stereoscopic tapestry image at the first dynamic range by inserting pixels from the original second view image into a copy of the original first view image in accordance with an occlusion map, such that the original autostereoscopic or stereoscopic tapestry image comprises disoccluded regions containing pixels occluded in the first view image but non occluded in the original second view image;
generating a first view image at a second dynamic range, wherein the first dynamic range is higher than the second dynamic range;
predicting, by a computer and based on the original first view image, a first view image at the first dynamic range from the first view image at the second dynamic range, thereby obtaining a predicted first view image;
providing, by a computer, a first displacement map, wherein the first displacement map comprises distance information between the original first view image at the first dynamic range and the original autostereoscopic or stereoscopic tapestry image at the first dynamic range;
applying an inverse displacement operation to the predicted first view image, thereby obtaining a predicted tapestry image, wherein the inverse displacement operation comprises shifting pixels from a position in the predicted first view image to a position in the predicted tapestry image based on the first displacement map;
interpolating unfilled pixels in the predicted tapestry image; and
calculating a difference between the original autostereoscopic or stereoscopic tapestry image and the predicted tapestry image, thereby obtaining a residual.

2. The computer-based method of claim 1, wherein the generating the first view image at the second dynamic range comprises a content mapping operation.

3. The computer-based method of claim 1, wherein the predicting, by a computer, the first view image at the first dynamic range comprises an inverse mapping operation.

4. The computer-based method of claim 1, further comprising:
compressing the first view image at the second dynamic range, thereby obtaining a compressed first view image at the second dynamic range; and
decompressing the compressed first view image, thereby obtaining a decompressed first view image,
wherein the predicting, by a computer, the first view image at the first dynamic range is from the decompressed first view image.

5. The computer-based method of claim 4, further comprising:
encoding the residual;
transmitting the compressed first view image as a backward-compatible layer; and transmitting the encoded residual as an enhancement layer.

6. The computer-based method of claim 5, wherein the encoding the residual comprises a non-linear quantizer operation, a downsampling operation and a compression operation.

7. The computer-based method of claim 6, wherein the predicting, by a computer, a first view image at the first dynamic range from the first view image at the second dynamic range comprises determining prediction parameters, and further comprising transmitting the prediction parameters as metadata.

8. The computer-based method of claim 6, further comprising transmitting parameters from the non-linear quantizer operation as metadata.

9. The computer-based method of claim 1, wherein the original autostereoscopic or stereoscopic tapestry image and the predicted tapestry image are frames of a video.

10. The computer-based method of claim 1, wherein the applying an inverse displacement operation further comprises:
  comparing a displacement for at least two pixels, thereby determining a pixel of the at least two pixels having a greater displacement than remaining pixels of the at least two pixels; and
  selecting the pixel having the greater displacement.

11. The computer-based method of claim 1, further comprising:
  compressing the first displacement map, thereby obtaining a compressed first displacement map,
  wherein the applying an inverse displacement operation to the predicted first view image is based on the compressed first displacement map.

12. The computer-based method of claim 11, wherein the compressing the first displacement map comprises fitting a piecewise function with a piecewise polynomial.

13. A computer-based method comprising:
  receiving a first view image at a first dynamic range;
  receiving a second view image different than the first view image:
  predicting, by a computer, a first view image at a second dynamic range from the first view image at the first dynamic range, thereby obtaining a predicted first view image, wherein the first dynamic range is lower than the second dynamic range;
  receiving a first displacement map, wherein the first displacement map comprises distance information between an original first view image at the second dynamic range and an original autostereoscopic or stereoscopic tapestry image at the second dynamic range;
  applying an inverse displacement operation to the predicted first view image, thereby obtaining a predicted tapestry image, wherein the inverse displacement operation comprises shifting pixels from a position in the predicted first view image to a position in the predicted tapestry image based on the first displacement map;
  interpolating unfilled pixels in the predicted tapestry image;
  receiving an enhancement layer that was built from a residual of a tapestry image and a predicted tapestry image, the tapestry image comprising inserted pixels from an original second view image into an original first view image in accordance with an occlusion map, such that the tapestry image comprises disoccluded regions containing pixels occluded in the first view image but non occluded in the original second view image;
  adding the enhancement layer to the predicted tapestry image, thereby obtaining a reconstructed tapestry image:
  receiving a second displacement map, wherein the second displacement map comprises distance information between an original second view image at the second dynamic range and the original autostereoscopic or stereoscopic tapestry image at the second dynamic range; and
  generating a desired view image, based on the first and second displacement maps, and on the reconstructed tapestry image,
  wherein the original autostereoscopic or stereoscopic tapestry image comprises disoccluded regions.

14. The computer-based method of claim 13, further comprising, prior to the adding the enhancement layer to the predicted tapestry image, decompressing the enhancement layer, upsampling the enhancement layer and applying a non-linear dequantizer operation to the enhancement layer.

15. The computer-based method of claim 14, wherein the applying a non-linear dequantizer operation comprises receiving non-linear quantizer parameters.

16. The computer-based method of claim 13, wherein the predicting, by a computer, a first view image comprises receiving prediction parameters.

17. The computer-based method of claim 13, wherein the first view is a left view, a leftmost view, a right view, a rightmost view, or a central view of a 3D image.

18. A non-transitory computer-readable storage medium having stored thereon computer-executable instruction for executing a method with a computer in accordance with claim 1.

* * * * *